(12) United States Patent  
Kikuchi et al.

(10) Patent No.: US 9,874,770 B2
(45) Date of Patent: Jan. 23, 2018

(54) DISPLAY DEVICE

(71) Applicant: Sharp Kabushiki Kaisha, Osaka-shi, Osaka (JP)

(72) Inventors: Ryoh Kikuchi, Osaka (JP); Takehiro Murao, Osaka (JP); Takuto Yoshino, Osaka (JP); Hiroshi Fukushima, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 11 days.

(21) Appl. No.: 15/036,113

(22) PCT Filed: Aug. 13, 2014

(86) PCT No.: PCT/JP2014/071376
§ 371 (c)(1),
(2) Date: May 12, 2016

(87) PCT Pub. No.: WO2015/072193
PCT Pub. Date: May 21, 2015

(65) Prior Publication Data
US 2016/0291358 A1   Oct. 6, 2016

(30) Foreign Application Priority Data

Nov. 15, 2013   (JP) .................. 2013-237442

(51) Int. Cl.
*G02F 1/13* (2006.01)
*G02F 1/1345* (2006.01)
(Continued)

(52) U.S. Cl.
CPC ....... *G02F 1/1323* (2013.01); *G02B 27/2214* (2013.01); *G02F 1/1339* (2013.01); *G02F 1/1345* (2013.01); *G02F 1/1347* (2013.01); *G02F 1/133308* (2013.01); *G02F 1/134309* (2013.01); *G02F 1/136286* (2013.01);
(Continued)

(58) Field of Classification Search
CPC ............ G02F 1/133308; G02F 1/1341; G02F 1/136286; G02F 1/133345; G02F 1/134336; G02F 1/134309; G02F 1/1345; G02F 1/13458; G02F 1/1323; G02F 1/13452;
(Continued)

(56) References Cited

U.S. PATENT DOCUMENTS

2006/0146208 A1   7/2006   Kim
2013/0057575 A1   3/2013   An et al.

FOREIGN PATENT DOCUMENTS

JP   2003-121870 A   4/2003
JP   2006-189764 A   7/2006
(Continued)

OTHER PUBLICATIONS

Official Communication issued in International Patent Application No. PCT/JP2014/071376, dated Sep. 16, 2014.

*Primary Examiner* — Thoi Duong
(74) *Attorney, Agent, or Firm* — Keating & Bennett, LLP

(57) ABSTRACT

A display device (1) includes a display panel (10), a switch liquid crystal panel (20), and a control unit (40). The switch liquid crystal panel (20) includes a transparent electrode (2) provided in an active area (AA) on at least one of a first substrate (21) and a second substrate (22), and a metal line (3) provided outside the active area (AA) on at least one of the first substrate (21) and the second substrate (22), along four sides of the active area (AA).

10 Claims, 25 Drawing Sheets

(51) Int. Cl.
*G09F 9/00* (2006.01)
*G02F 1/1347* (2006.01)
*G02B 27/22* (2006.01)
*H04N 13/04* (2006.01)
*G02F 1/1333* (2006.01)
*G02F 1/1339* (2006.01)
*G02F 1/1343* (2006.01)
*G02F 1/1362* (2006.01)
*G09F 9/30* (2006.01)
G02F 1/1335 (2006.01)
G02F 1/1368 (2006.01)

(52) U.S. Cl.
CPC .................. *G09F 9/00* (2013.01); *G09F 9/30* (2013.01); *H04N 13/0409* (2013.01); *H04N 13/0497* (2013.01); *G02F 1/1368* (2013.01); *G02F 1/13439* (2013.01); *G02F 1/133345* (2013.01); *G02F 1/133514* (2013.01); *G02F 1/133528* (2013.01)

(58) Field of Classification Search
CPC ........ G02F 2001/133302; G02F 2001/133388; G02F 2001/133612
USPC ... 349/58, 142, 139, 143, 153, 74, 150, 152, 349/15
See application file for complete search history.

(56) References Cited

FOREIGN PATENT DOCUMENTS

| | | |
|---|---|---|
| JP | 2010-128676 A | 6/2010 |
| JP | 2013-024957 A | 2/2013 |
| JP | 2013-190981 A | 9/2013 |

DISPLAY DEVICE

TECHNICAL FIELD

The present disclosure relates to a writing technique in a display device that includes a switch liquid crystal panel.

BACKGROUND ART

Conventionally, a display device composed of a display panel and a switch liquid crystal panel stacked thereon so that the view of displayed images is controlled has been developed. For example, a display device in which a parallax barrier is formed by the switch liquid crystal panel so that a right-eye image and a left-eye image, which are different from each other, are visible to the right eye and the left eye of a viewer, respectively, is proposed (see, for example, Patent Document 1). Besides, in recent years, frequently it is requested to narrow peripheral portions of a display region of a display device in order to reduce the size of a case body thereof whereas increasing the size of a display screen thereof; that is, the so-called frame narrowing is requested.

PRIOR ART DOCUMENT

Patent Document

[Patent Document 1] JP-A-2013-24957

SUMMARY OF THE INVENTION

Problem to be Solved by the Invention

When the frame narrowing is to be achieved in a display device including a switch liquid crystal panel, restrictions are imposed on the line designing in regions outside of the display region of the switch liquid crystal panel. For example, when an area where lines can be arranged has a smaller width around the display region, it is necessary to make lines thinner. In a case where a transparent conductive material is used for forming the lines, however, the thinning of the lines causes the resistance of the lines to increase, which makes it difficult to perform control appropriately.

To cope with this, the present application discloses a switch liquid crystal panel and a display device that can meet the request for the frame narrowing, while ensuring freedom in designing of lines.

Means to Solve the Problem

A display device of the present application includes: a display panel having a display region for displaying an image; a switch liquid crystal panel arranged so as to be stacked on the display panel; and a control unit that controls the switch liquid crystal panel. The switch liquid crystal panel includes: a first substrate; a second substrate arranged so as to be opposed to the first substrate; a liquid crystal layer provided between the first substrate and the second substrate; a transparent electrode provided in an active area that is an area overlapping the display region of the display panel, on at least one of the first substrate or the second substrate, wherein a voltage thereof is controlled based on a signal from the control unit; and a metal line provided outside the active area, along four sides of the active area, on at least one of the first substrate and the second substrate.

Effect of the Invention

According to the disclosure of the present application, the request for the frame narrowing can be met, while the freedom in designing of lines for a switch liquid crystal panel can be ensured.

MODE FOR CARRYING OUT THE INVENTION

Figure 1:
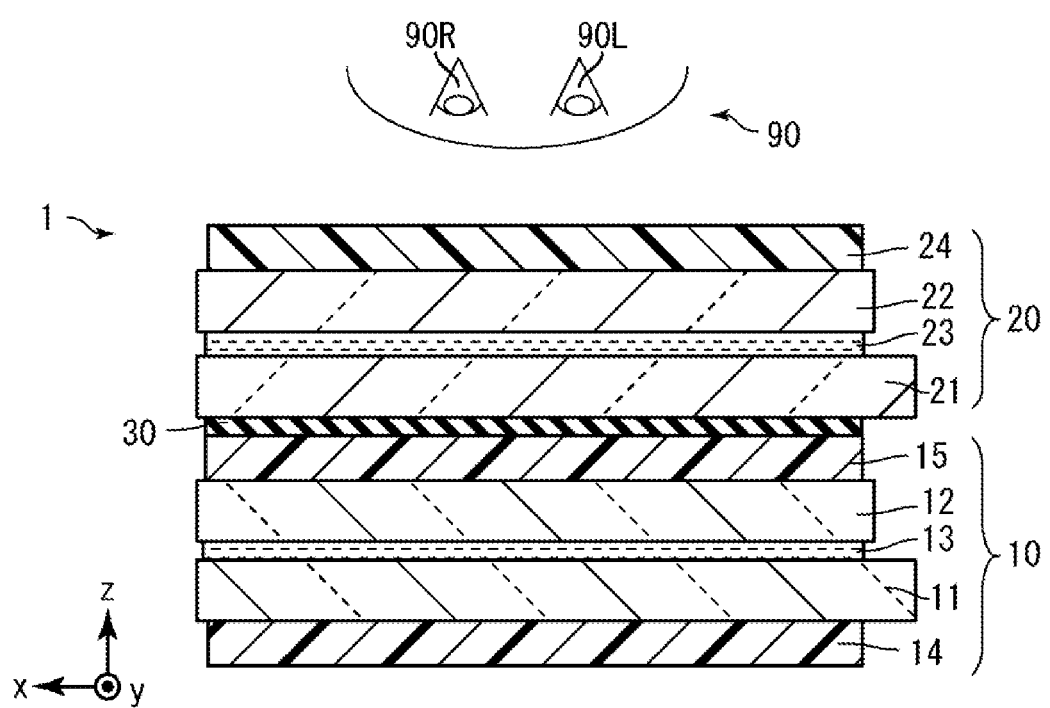
FIG. 1 is a cross-sectional view schematically illustrates an exemplary configuration of a display device according to Embodiment 1.

A display device according to one embodiment of the present invention includes: a display panel having a display region for displaying an image; a switch liquid crystal panel arranged so as to be stacked on the display panel; and a control unit that controls the switch liquid crystal panel. The switch liquid crystal panel includes: a first substrate; a second substrate arranged so as to be opposed to the first substrate; a liquid crystal layer provided between the first substrate and the second substrate; a transparent electrode provided in an active area that is an area overlapping the display region of the display panel, on at least one of the first substrate or the second substrate, wherein a voltage thereof is controlled based on a signal from the control unit; and a metal line provided outside the active area, along four sides of the active area, on at least one of the first substrate and the second substrate.

According to the above-described configuration, in the switch liquid crystal panel, the transparent electrode is arranged in the area corresponding to a display region of the display panel, that is, the active area. Further, outside the active area, the metal lines provided along the four sides of the active area is arranged. In this way, in the switch liquid crystal panel, a metal line having a lower resistance as compared with the transparent conductive body is arranged outside the active area. This allows the area of the line to be smaller as compared with a case where the line is formed with a transparent conductive body. Still further, by arranging the metal line along the four sides of the active area, the metal line is equally arranged around the active area. With this configuration, appearance quality is by no means degraded by, for example, reflection or cutoff of light by a metal line arranged around the active area; the appearance quality can be rather improved. In the switch liquid crystal panel, therefore, a metal line having a low resistance can be arranged outside the active area, without restrictions relating to appearance quality being imposed thereon. As a result, it is possible to meet the request for the frame narrowing, while ensuring the freedom in designing of lines of the switch liquid crystal panel.

The metal line may include a plurality of linear portions arranged in parallel, with a gap being interposed therebetween. Since light is not blocked in gaps (spaces) between the linear portions, influences of light cutoff by the metal line are reduced. Therefore, by providing a plurality of linear portions, the area where the metal line is formed can be expanded, while the influences of light cutoff can be reduced at the same time. As a result, the degree of the freedom in designing of the metal line is further increased.

The metal line may include a plurality of metal wires, and the metal wires include: a wire connected to the transparent electrode; and a dummy line not connected to the transparent electrode.

In the switch liquid crystal panel, the dummy line, not connected to the transparent electrode, is included in the metal line outside the active area, which allows the size or shape of the line formed on the four sides of the active area to be adjusted. Besides, even if a short circuit, breaking, etc. occurs to the dummy line, it does not become a serious problem, and hence, restrictions on the arrangement place and the shape are loose. Therefore, regarding the line as a whole, the degree of the freedom in design is further increased.

On at least one side of the four sides of the active area, the metal line may be composed of only the dummy line. This allows the line designing to be performed without consideration to a short circuit or breaking of the line around the at least one side.

The switch liquid crystal panel may further include a sealing member that bonds the first substrate and the second substrate. At least a part of the dummy line may be provided at such a position that the part overlaps the sealing member.

Even if a short circuit, breaking, or the like occurs to the metal line due to influences of the sealing member, the foregoing configuration prevents such a problem from becoming serious. As a result, the metal line can be arranged also at such a position that the metal line overlaps the sealing member, which allows the degree of the freedom in design to be further increased.

The above-described display device can further include a frame provided so as to surround the active area, wherein on the four sides of the active area, at least a part of the metal line is formed in an area between the frame and the active area.

With this configuration, for example, even in a case where the frame is displaced due to influences of tolerance upon assembly of the switch liquid crystal panel, the state in which the metal line remains to be visible can be maintained around all of the four sides of the active area. This makes it possible to suppress reductions in the appearance quality due to displacement of the frame, as well as other defects.

The entirety of the metal line may be formed in the area between the frame and the active area.

This causes the following situation to hardly occur: portions at which the metal line is behind the frame and portions at which the line is not behind the frame are present together due to the displacement of the frame. This makes it possible to suppress reductions in the appearance quality due to displacement of the frame, as well as other defects.

The configuration may be such that the area between the frame and the active area, where the metal line is formed, has a uniform width on the four sides of the active area, the width being a width in a direction vertical to the active area.

This allow the metal line to be arranged in an area that is outside the active area and is not covered with the frame, so as to be arranged equally on the four sides of the area. As a result, for example, the appearance quality can be improved further.

The configuration may be such that the metal line includes a plurality of first lines formed on the first substrate, along the four sides of the active area, and a plurality of second lines formed on the second substrate, along the four sides of the active area, wherein the first lines and the second lines are formed at such positions that the first lines and the second lines do not overlap.

This makes it possible to distribute the arrangement of the metal line to the first substrate and to the second substrate. Besides, this makes it possible to prevent the switch liquid crystal panel from becoming partially thicker.

The display panel may be a liquid crystal panel that includes: an active matrix substrate; a liquid crystal layer; and a counter substrate provided so as to face the active matrix substrate with the liquid crystal layer being interposed therebetween.

The aspect may be such that the display device further includes a position sensor that acquires position information of a viewer, and the control unit controls the switch liquid crystal panel according to the position information. With this, the display device can be formed into a stereoscopic display device. The switch liquid crystal panel is not limited to that for controlling stereoscopic display. The switch liquid crystal panel may be, for example, that for controlling a viewing angle.

A switch liquid crystal panel arranged so as to be stacked on a display panel that has a display region for displaying an image is also an embodiment of the present invention. The switch liquid crystal panel includes a first substrate; a second substrate arranged so as to be opposed to the first substrate; a liquid crystal layer provided between the first substrate and the second substrate; a transparent electrode provided in an active area that is an area overlapping the display region of the display panel, on at least one of the first substrate or the second substrate, wherein a voltage thereof is controlled based on a signal from the control unit; and a metal line provided outside the active area, along four sides of the active area, on at least one of the first substrate and the second substrate.

The following describes embodiments of the present invention in detail, while referring to the drawings. In the drawings, identical or equivalent parts in the drawings are denoted by the same reference numerals, and the descriptions of the same are not repeated. To make the explanation easy to understand, in the drawings referred to hereinafter, the configurations are simplified or schematically illustrated, or a part of constituent members are omitted. Further, the dimension ratios of the constituent members illustrated in the drawings do not necessarily indicate the real dimension ratios.

Embodiment 1

Exemplary Configuration of Display Device

FIG. 1 is a schematic cross-sectional view illustrating an exemplary configuration of a display device according to Embodiment 1 of the present invention. The display device illustrated in FIG. 1 is a stereoscopic display device 1 that includes a display panel 10, and a switch liquid crystal panel 20. The display panel 10 and the switch liquid crystal panel 20 are arranged so as to be stacked in such a manner that the switch liquid crystal panel 20 is positioned on the viewer 90 side, and are bonded to each other with an adhesive resin 30. As the adhesive resin 30, for example, a UV curing resin can be used.

The display panel 10 includes a TFT (thin film transistor) substrate 11, a CF (color filter) substrate 12, a liquid crystal layer 13, and polarizing plates 14 and 15. The display panel 10 controls the TFT substrate 11 and the CF substrate 12 so as to operate the alignment of liquid crystal molecules in the liquid crystal layer 13. The display panel 10 is irradiated with light from a backlight unit that is not illustrated. The backlight unit therefore can be arranged on a surface on a side opposite to a surface of the display panel 10 on which the switch liquid crystal panel 20 is provided. The display panel 10 controls of the amount of transmitted light for each pixel, by using the liquid crystal layer 13 and the polarizing plates 14 and 15, whereby images are displayed. The area where the pixels are provided becomes a display region.

The switch liquid crystal panel 20 includes a first substrate 21, a second substrate 22, a liquid crystal layer 23, and a polarizing plate 24. The first substrate 21 and the second substrate 22 are arranged so as to be opposed to each other. The liquid crystal layer 23 is provided between the first substrate 21 and the second substrate 22. The polarizing plate 24 is arranged on the viewer 90 side (the side opposite to the side where the display panel 10 is provided). In the switch liquid crystal panel 20, a portion that overlaps the display region of the display panel is preferably formed with a transparent material, or a material with which the light transmission and the light cutoff can be switched from one to the other. Outside the display region, a frame (not shown) may be provided so as to surround the display region. The frame can be formed with a material that blocks light.

On at least one of the first substrate and the second substrate, in an area corresponding to the display region, transparent electrodes are provided. To each transparent electrode, a voltage based on a signal from the control unit (details thereof are described below) that controls the switch liquid crystal panel 20 is applied. By so doing, a voltage can be applied to the liquid crystal in the liquid crystal layer 23. Though FIG. 1 does not illustrate the detailed configuration, a plurality of electrodes are formed on the first substrate 21 and the second substrate 22 in the present embodiment. The switch liquid crystal panel 20 controls potentials of these electrodes to operate the alignment of liquid crystal molecules of the liquid crystal layer 23, thereby to change behavior of light passing through the liquid crystal layer 23. More specifically, the switch liquid crystal panel 20 forms non-transmitting regions (barriers) that block light from the display panel 10, and transmitting regions (slits) that transmit light from the display panel 10, by using the alignment of the liquid crystal molecules of the liquid crystal layer 23 and the operations of the polarizing plate 24. The configurations and operations of the first substrate 21 and the second substrate 22 are to be described in detail below.

The TFT substrate 11 and the CF substrate 12 have a thickness of, for example, 200 μm each. The polarizing plate 14 has a thickness of, for example, 137 μm. The polarizing plate 15 has a thickness of, for example, 170 μm. The first substrate 21 and the second substrate 22 has a thickness of, for example, 225 μm each. The thickness of the adhesive resin 30 is, for example, 50 μm.

The polarizing plate 15 may be arranged on the switch liquid crystal panel 20. More specifically, the configuration may be such that the polarizing plate 15 is arranged on a surface on the display panel 10 side of the first substrate 21 of the switch liquid crystal panel 20, and the adhesive resin 30 is arranged between the polarizing plate 15 and the CF substrate 12.

Hereinafter, a direction parallel to a line segment extending between the left eye 90L and the right eye 90R of the viewer 90 when the viewer 90 and the stereoscopic display device 1 face each other directly (the x direction in FIG. 1) is referred to as the "horizontal direction". Further, the direction orthogonal to the horizontal direction in the surface of the display panel 10 (the y direction in FIG. 1) is referred to as the "vertical direction".

Exemplary Electrode Arrangement on Switch Liquid Crystal Panel

Figure 2A:
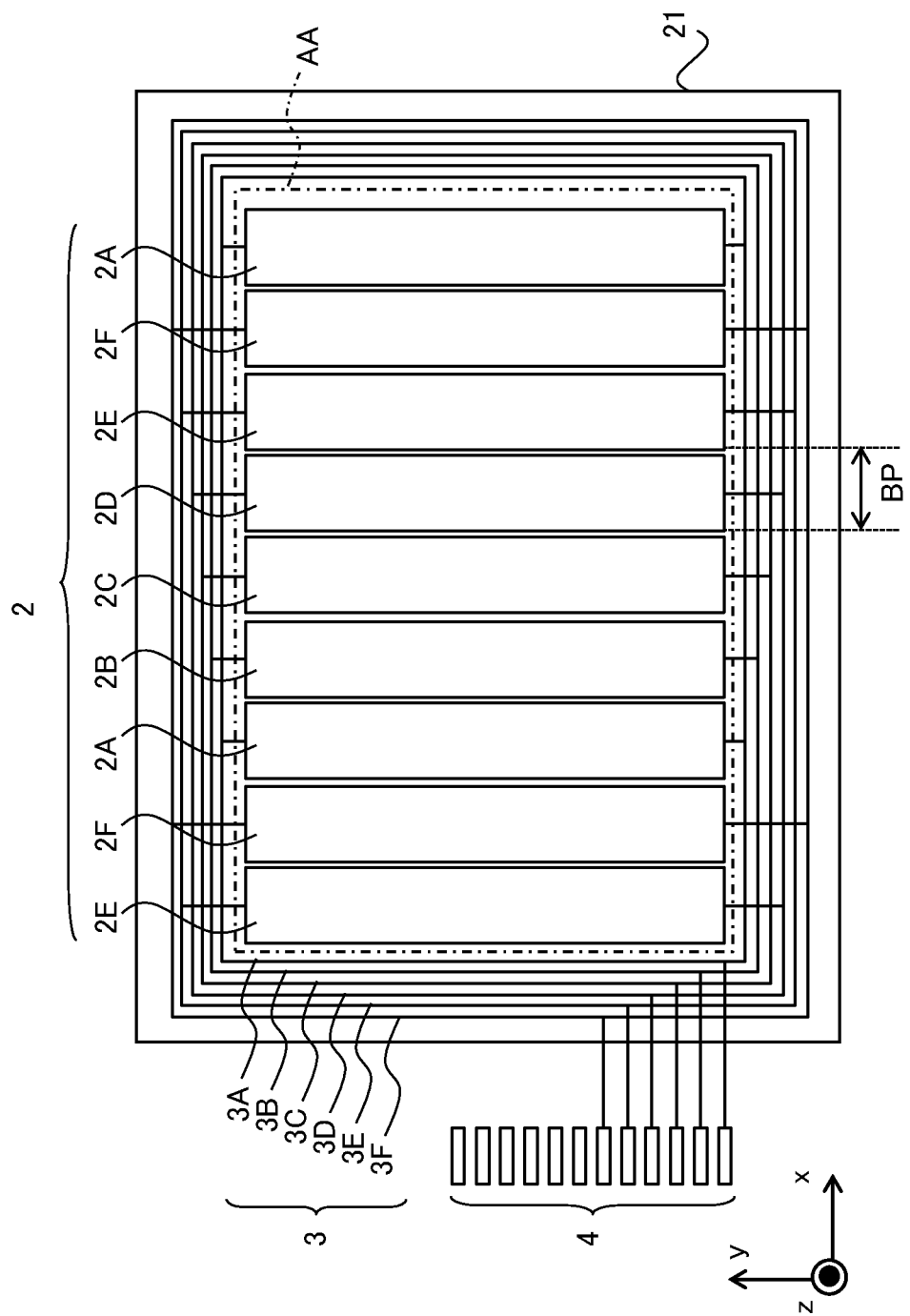
FIG. 2A illustrates an exemplary arrangement of electrodes provided on a first substrate.
Figure 2B:
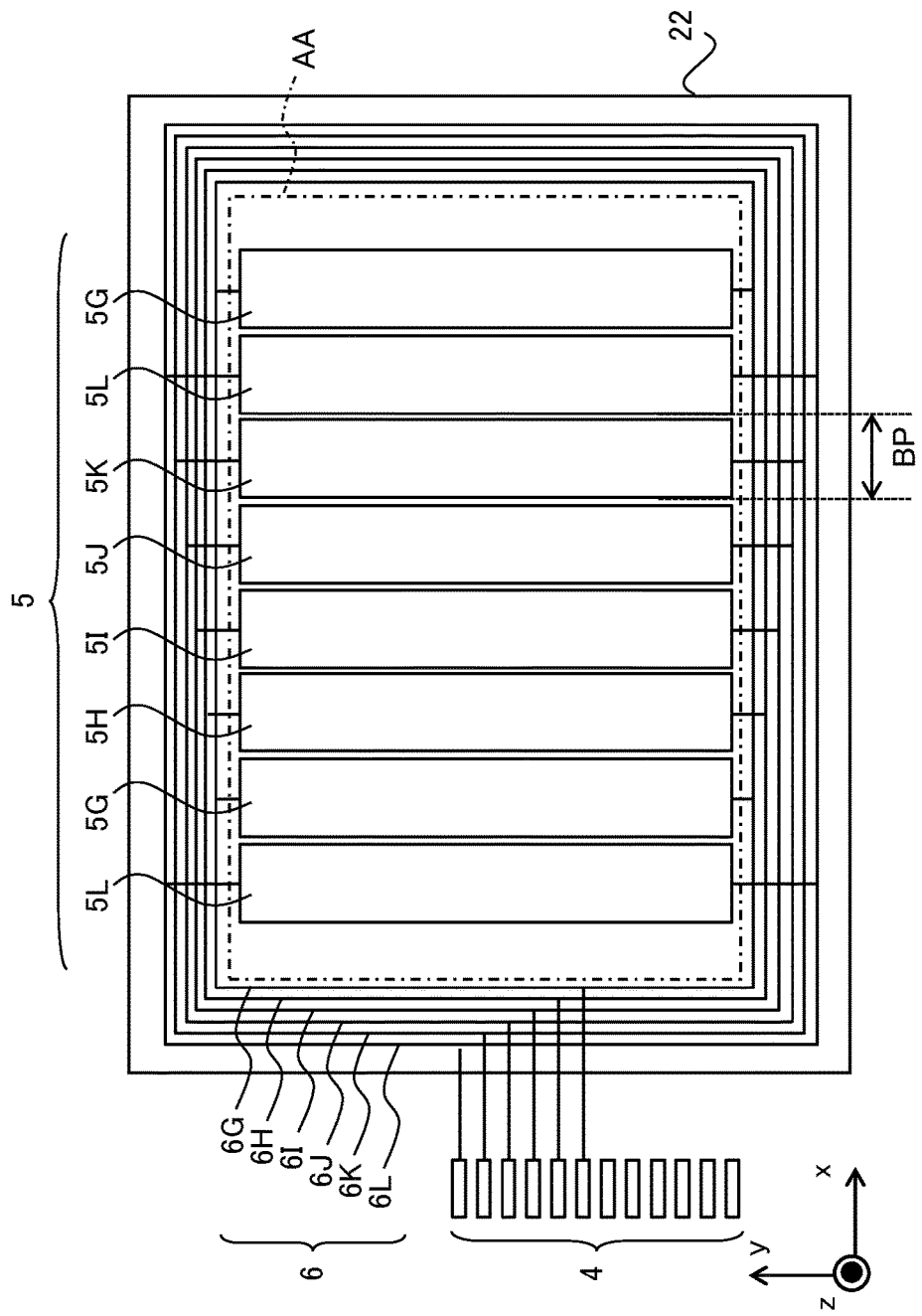
FIG. 2B illustrates an exemplary arrangement of electrodes provided on a second substrate.

FIG. 2A illustrates an exemplary arrangement of electrodes provided on the first substrate 21 of the switch liquid crystal panel 20. FIG. 2B illustrates an exemplary arrangement of electrodes provided on the second substrate 22.

In the example illustrated in FIG. 2A, on the first substrate 21, a first electrode group 2 and a first line group 3 are arranged, which are provided in an area overlapping the display region of the display panel 10 (active area AA), and outside the active area AA, respectively. The first electrode group 2 is a transparent electrode group. The first electrode group 2 includes a plurality of electrodes arranged in the x direction at electrode intervals BP. Each of the electrodes extends in the y direction, and the electrodes are arranged so as to be parallel to each other.

The first line group 3 is exemplary metal lines provided along the four sides of the active area AA. The first electrode group 2 is connected to the first line group 3. The first line group 3 is also connected to the terminals 4 for the connection with the outside. For example, a control unit (not shown) that outputs a signal for controlling the voltage of the first electrode group 2 is connected to the terminals 4. Thereby, the signal from the control unit is applied to the first electrode group 2 via the terminals 4 and the first line group 3.

In the present example, the first line group 3 includes line groups of six systems, and the first electrode group 2 includes electrode groups of six systems. The line groups of six systems 3A, 3B, 3C, 3D, 3E, and 3F, are connected to the electrode groups of six systems 2A, 2B, 2C, 2D, 2E, and 2F, respectively. To the electrode groups of six systems 2A to 2F, voltages VA to VF, which are independent from one another, can be applied.

In the example illustrated in FIG. 2B, on the second substrate 22, a second electrode group 5 and a second line group 6 are arranged, which are provided in the active area AA and outside the active area AA, respectively. The second electrode group 5 is a transparent electrode group. The second electrode group 5 includes a plurality of electrodes that are arranged in the x direction at electrode intervals BP. Each of the electrodes extends in the y direction, and the electrodes are arranged so as to be parallel to each other.

The second line group 6 is exemplary metal lines provided along the four sides of the active area AA. The second electrode group 5 is connected to the second line group 6. The second line group 6 is also connected to the terminals 4 for the connection with the outside. For example, a control unit (not shown) that outputs a signal for controlling a voltage of the second electrode group 5 is connected to the terminals 4. Thereby, the signal from the control unit is applied to the second electrode group 5 via the terminals 4 and the second line group 6.

In the present example, the second line group 6 includes line groups of six systems, and the second electrode group 5 includes electrode groups of six systems. The line groups of six systems 6G, 6H, 6I, 6J, 6K, and 6L are connected to the electrode groups of six systems 5G, 5H, 5I, 5J, 5K, and 5L, respectively. To the electrode groups of six systems 5G to 5L, voltages VG to VL, which are independent from one another, can be applied.

Transparent electrodes forming the first electrodes 2 and the second electrodes 5 are made of, for example, ITO (indium tin oxide). For forming the metal lines, for example, Ti (titanium), Al (aluminum), or Mo (molybdenum) can be used. The metal lines can be made of a material having a lower resistance (for example, about 0.2Ω) as compared with the resistance of transparent electrodes made of ITO or the like (about 40 to 60Ω). The electrode interval BP (barrier pitch) for the first electrode group 2 and the second electrode group 5 can be set to, for example, 15.976 μm.

Both of the first line group 3 and the second line group 6 are provided so as to extend along the four sides of the rectangular area of the active area AA. In other words, the first line group 3 and the second line group 6 are arranged so as to be parallel to the four sides of the active area AA, which are the following sides: the two sides that are opposed to each other, from which the transparent electrodes are drawn out, (upper and lower sides of the active area AA illustrated in FIGS. 2A and 2B); and the two sides adjacent to the foregoing two sides (right and left sides of the active area AA illustrated in FIGS. 2A and 2B). Here, it is preferable to uniformly route the first line group 3 and the second line group 6 all around the active area AA. In other words, it is preferable that an area where the first line group 3 and the second line group 6 are formed (hereinafter, it is referred to as a line area) is uniformly distributed outside the four sides of the active area AA.

In this way, lines outside the active area AA are made of a metal, and are arranged so as to extend along the four sides, whereby the display region of the display panel can be rimmed by metal lines. This improves appearance quality. Further, since the display region is rimmed by metal lines, even in a case where, for example, a frame surrounding the display region is provided, reductions in the appearance quality due to displacement of the frame that occurs when the frame is assembled can be suppressed. By forming the metal lines so that they are visible purposely in this way, margins for the assembly of a case body of the display device and the like can be expanded, so that the productivity can be improved. Moreover, since the metal lines can be arranged without being limited by the frame position, the degree of the freedom in designing of lines is increased. The effects of these are remarkable in particular when the switch liquid crystal panel 20 is arranged on the viewer side as shown in FIG. 1. Further, since the first and second line groups are formed with a metal, which means that the lines can be formed with a material having a low resistance, lines can be arranged efficiently, which makes it easier to respond to the frame narrowing.

The configuration in which the metal lines are arranged along the four sides encompasses a configuration that allows a viewer to visually recognize that metal lines are provided along the four sides even if the metal lines are partially absent on any one of the four sides.

Exemplary Arrangement of Frame and Metal Lines

Figure 3:
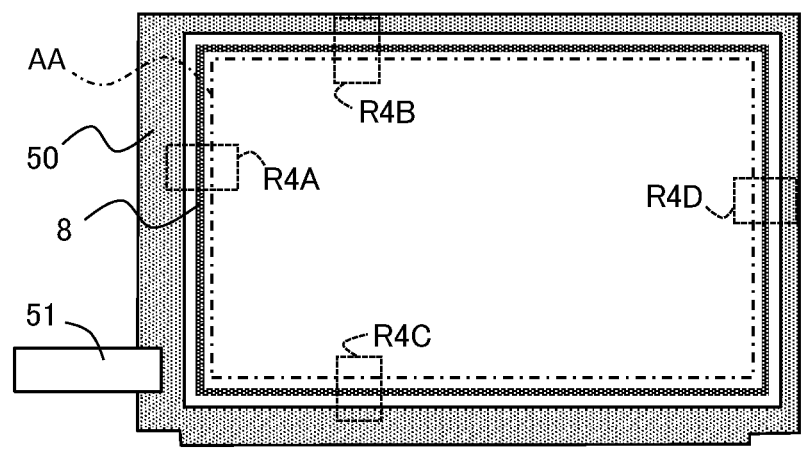
FIG. 3 illustrates an exemplary arrangement of a frame and metal lines.

FIG. 3 illustrates an exemplary arrangement of a frame 50 and the metal lines. In the example illustrated in FIG. 3, the frame 50 is provided so as to surround the active area AA. The frame 50 is a light-shielding member that covers an area outside the active area AA on the viewer-side surface of the display device 1. The frame 50 is formed with, for example, a frame body that has an opening corresponding to the active area AA. The frame 50 may be, for example, a part of a case body that houses the display device 1 (bezel), or alternatively, a film provided around the active area AA on the viewer-side surface of the switch liquid crystal panel 20. In the present example, in a part of the frame 50, a notch is provided for arranging a FPC (flexible printed circuit) 51 to be connected to the terminals 4.

In the example illustrated in FIG. 3, a line area 8 where metal lines are formed is provided between the frame 50 and the active area AA. The line area 8 is an area where the first line group 3 and the second line group 4 illustrated in FIGS. 2A and 2B are arranged.

Figure 4A:
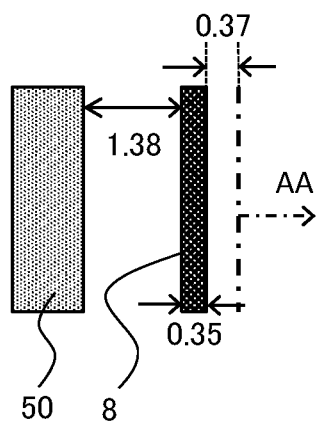
FIG. 4A is an enlarged view of an area R4A indicated by a broken line illustrated in FIG. 3.
Figure 4B:
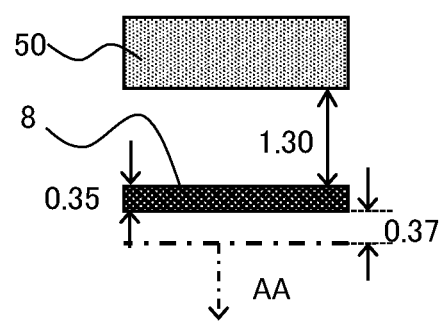
FIG. 4B is an enlarged view of an area R4B indicated by a broken line illustrated in FIG. 3.
Figure 4C:
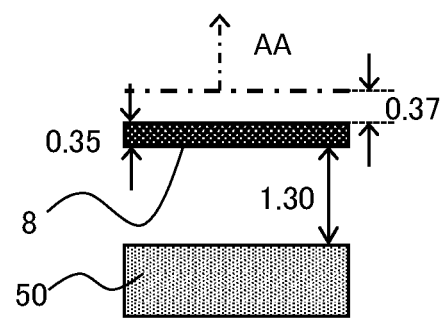
FIG. 4C is an enlarged view of an area R4C indicated by a broken line illustrated in FIG. 3.
Figure 4D:
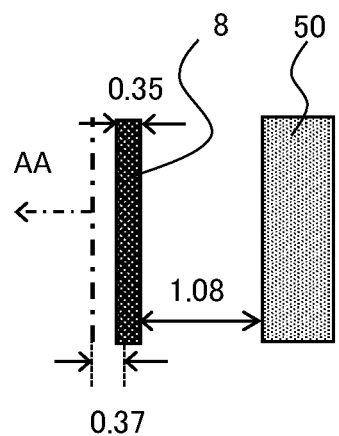
FIG. 4D is an enlarged view of an area R4D indicated by a broken line illustrated in FIG. 3.

FIGS. 4A, 4B, 4C, and 4D are enlarged views of the areas R4A, R4B, R4C, and R4D that are indicated by broken lines in FIG. 3, respectively. In FIGS. 4A to 4D, the units indicating the dimensions are "mm". In the present exemplary arrangement, as illustrated in FIGS. 4A to 4D, on any one of the four sides of the active area AA, the lines in the line area 8 have a width of 0.35 mm each, and the distance between the line area 8 and the active area AA is 0.37 mm. As illustrated in FIG. 4A, on the left side of the active area AA, the distance from the line area 8 to the frame 50 is 1.38 mm. As illustrated in FIGS. 4B and 4C, on the upper and lower sides of the active area AA, the distance from the line area 8 to the frame 50 is 1.30 mm. As illustrated in FIG. 4D, on the right side of the active area AA, the distance from the line area 8 to the frame 50 is 1.08 mm. In this way, the distance between the line area 8 and the active area AA, and the line width of the line area 8 are set so as to be equal on the four sides, whereby the uniformity of the metal lines on the four sides is enhanced. Consequently, the appearance quality can be further improved.

Here, the case where the widths or the distances are "uniform" or "equal" encompasses a case where they are equal to such a degree that a human viewing the same by the naked eyes recognizes that they are equal, and is not necessarily limited to a case where they coincide strictly. In the present example, the width of the line area 8 is a distance from one line at the end among the plurality of lines arranged in parallel, to one line at the other end, the distance being in a direction vertical to the direction in which the lines extend. In other words, the respective widths on the four sides of the line area, in the directions vertical to the directions along the sides, respectively, are uniform.

Figure 5:
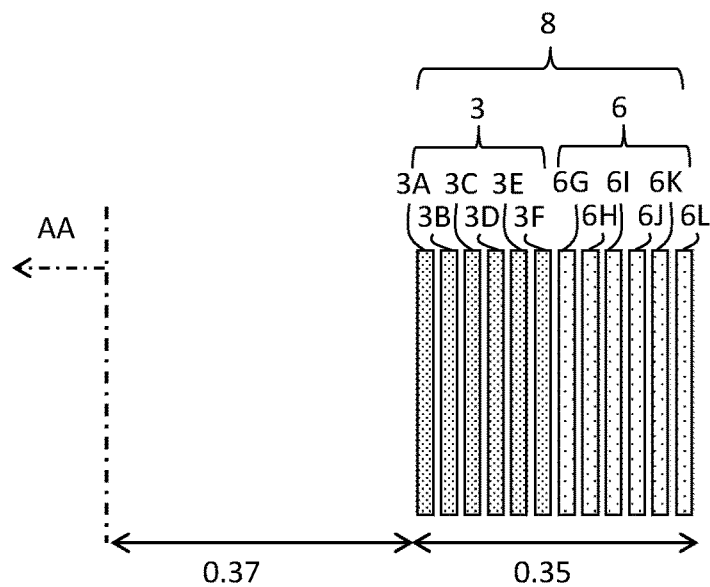
FIG. 5 is an enlarged view obtained by enlarging a part of the metal line.

FIG. 5 is an enlarged view obtained by further enlarging a part of the line area 8 on the right side of the active area AA illustrated in FIG. 4D. It should be noted that in the line area 8 on the other sides (the left side and the upper and lower sides) of the active area AA as well, the first line group 3 and the second line group 6 can be formed in the same manner as that in FIG. 5. In the example illustrated in FIG. 5, in the line area 8, a plurality of lines that extend in directions along the sides of the active area AA are included. More specifically, a plurality of the first line groups 3 formed on the first substrate 21, and a plurality of the second line groups 6 formed on the second substrate 22, are formed so as to be parallel with each other. In this way, the first line group 3 on the first substrate 21 and the second line group 6 on the second substrate 22 are formed so as not to overlap each other in the direction vertical to the surface of the first substrate 21, whereby the uniformity of the cell thickness can be ensured. The plurality of lines of the first line group 3 and the plurality of lines of the second line group 6 are arranged at equal intervals. In this way, by arranging a plurality of parallel lines at equal intervals, the uniformity (the design properties) can be improved.

In the example illustrated in FIG. 5, the first line group 3 including six linear patterns is formed on the inner side (on the active area AA side), and the second line group 6 including six linear patterns is formed on the outer side. Here, the line width (0.35 mm) of the metal lines indicates a distance from the inner end of the innermost linear pattern to the outer end of the outermost linear pattern. As one example, the configuration can be such that the line patterns included in the first line group 3 and the second line group 6 have a line width of 20 μm each and a distance therebetween of 10 μm each.

In the example illustrated in FIG. 5, the first line group 3 formed in the first substrate 21 is arranged on the inner side, and the second line group 6 formed in the second substrate 22 is arranged on the outer side, but the arrangement of the lines in the first substrate 21 and the second substrate 22 is not limited to that of the above-described example. For example, the second line group 6 may be arranged on the inner side, and the first line group 3 may be arranged on the outer side. Alternatively, the configuration may be such that the lines of the first substrate 21 and the lines of the second substrate are arranged alternately.

In the example illustrated in FIG. 3, the line area 8, that is, the first line group 3 and the second line group 6 are arranged between the active area AA and the frame 50, but the configuration may be such that a part of the line area 8 is covered with the frame 50. For example, among the lines provided on the four sides of the active area AA so as to be parallel to the sides, respectively, some lines on the outer side may be arranged so as to overlap the frame 50. In this case, preferably the lines are arranged so that, in portions that do not overlap the frame 50 in the line area 8, the line widths of the lines on the four sides are equal. In other words, preferably the widths of the line area 8 between the active area AA and the frame 50 on the four sides are equal. This allows the metal lines that are not behind the frame 50 to be uniformly arranged on the four sides, thereby improving the appearance quality further.

Exemplary Arrangement of Sealing Member and Metal Lines

Figure 6:
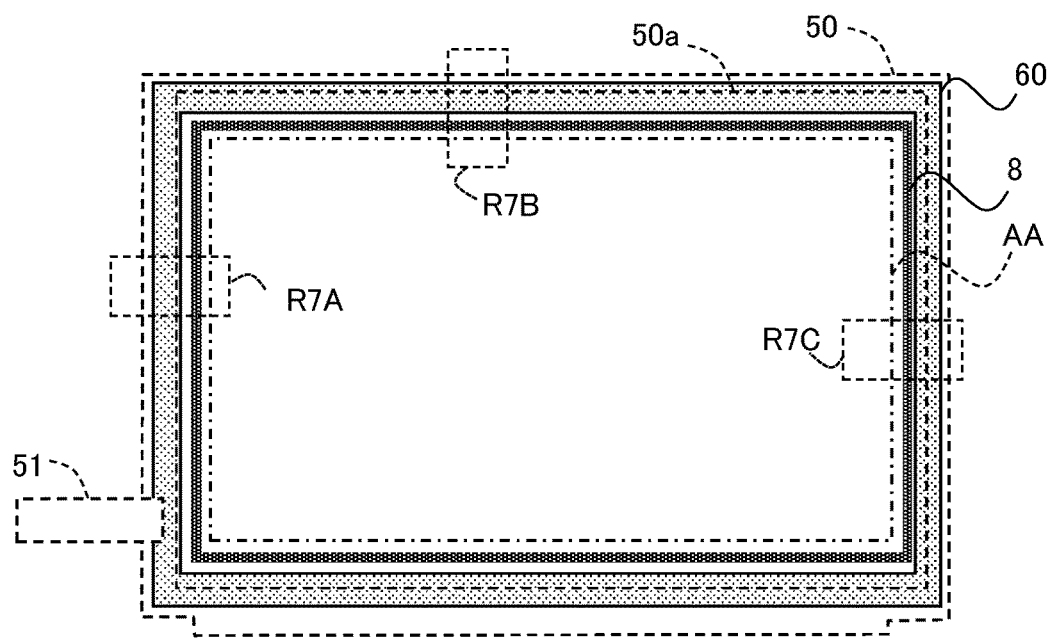
FIG. 6 illustrates an exemplary arrangement of a sealing member and metal lines.
Figure 7A:
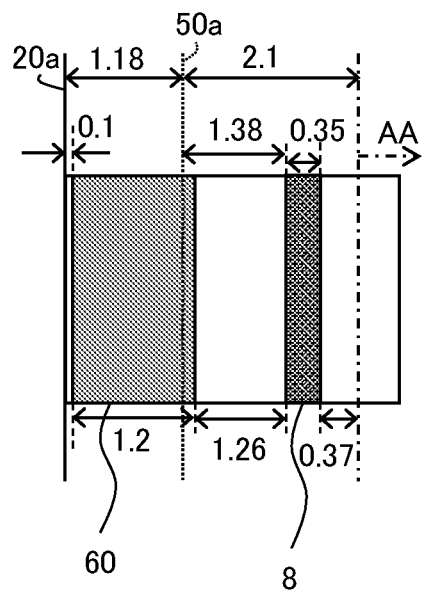
FIG. 7A is an enlarged view of an area R7A indicated by a broken line illustrated in FIG. 6.
Figure 7B:
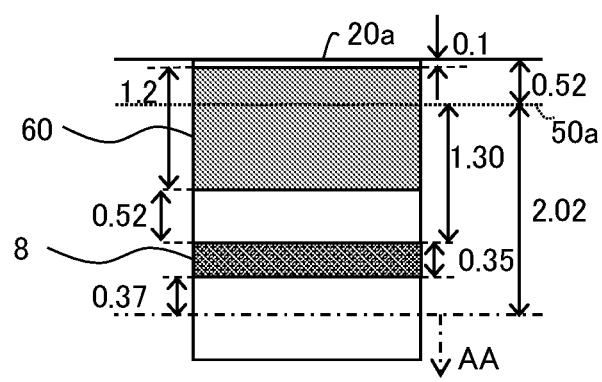
FIG. 7B is an enlarged view of an area R7B indicated by a broken line illustrated in FIG. 6.
Figure 7C:
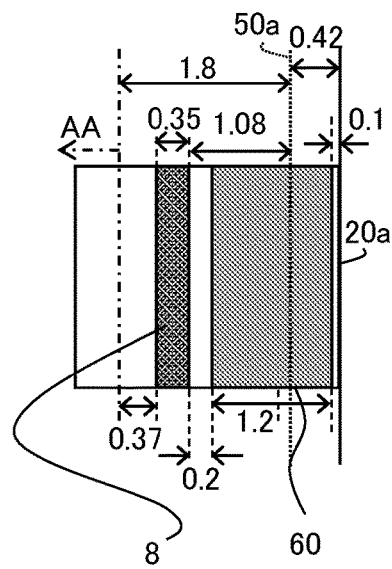
FIG. 7C is an enlarged view of an area R7C indicated by a broken line illustrated in FIG. 6.

FIG. 6 illustrates an exemplary arrangement of a sealing member and metal lines. FIGS. 7A, 7B, and 7C are enlarged views of the areas R7A, R7B, and R7C indicated by broken lines in FIG. 6, respectively. In FIGS. 6 and 7A to 7C, the line 50a indicates an edge of the opening of the frame, and the line 20a indicates an outer shape (end) of the switch liquid crystal panel. An enlarged view of the lower side of the active area AA will be identical to the view of FIG. 7B except that the orientation thereof is changed, and therefore the enlarged view of the lower side is omitted herein.

The sealing member 60 is a member that is provided between the first substrate 21 and the second substrate 22 so as to bond the first substrate 21 and the second substrate 22 to each other. In the example illustrated in FIG. 6, the sealing member 60 is provided outside the active area AA so as to surround the active area AA. As illustrated in FIGS. 6, 7A, 7B, and 7C, the sealing member 60 is in a 1.2 mm-wide belt form, provided along the four sides of the active area AA. The distance from the end (outer shape) of the switch liquid crystal panel to the sealing member 60 is 0.1 mm. On each of the four sides, a part of the sealing member 60 overlaps the frame 50, and the other part of the same, not overlapping the frame 50, is provided on the inner side to the frame 50, that is, between the frame 50 and the active area AA.

Between the sealing member 60 and the active area AA, the line area 8 is arranged. As illustrated in FIG. 7A, on one side among the four sides (in the present example, the side to which the FPC51 is connected, i.e., the terminal side where the terminals are provided), the distance between the line area 8 and the sealing member 60 (the width of the gap) is 1.26 mm. As illustrated in FIG. 7B, on the upper side, the distance between the metal lines and the sealing member 60 is 0.52 mm. This applies to the lower side. As illustrated in FIG. 7C, on the side (the right side) opposite to the side to which the FPC is connected (the terminal side), the distance between the line area 8 and the sealing member 60 is 0.2 mm.

The sealing member 60 contains a conductive material such as, for example, Au pearls, in some cases. In this case, if the metal lines are arranged at such positions that the metal lines overlap the sealing member 60, there is possibility that short-circuit defects occur in the lines. The position at which the line area 8 is arranged, therefore, is limited by the position at which the sealing member is arranged. In the present embodiment, the line area 8 is arranged uniformly on the four sides, whereby the line area 8 can be arranged in a portion that is not covered with the frame 50. This allows the area where the line area 8 can be arranged to be enlarged. This further allows the area where the sealing member can be arranged to be enlarged. In the present embodiment, therefore, the degree of the freedom in designing of the sealing member as well as the metal lines is increased.

Modification Example of Arrangement of Frame and Metal Lines

Figure 8:
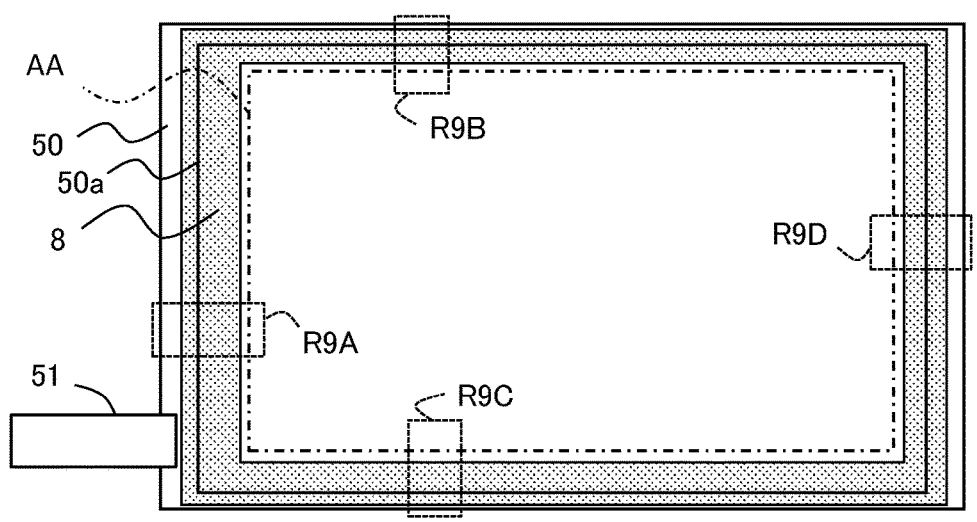
FIG. 8 illustrates a modification example of the arrangement of the frame and the metal lines.

FIG. 8 illustrates a modification example of the arrangement of the frame 50 and the metal lines. FIGS. 9A, 9B, 9C, and 9D are enlarged views of the areas R9A, R9B, R9C, and R9D indicated by broken lines in FIG. 8, respectively.

In the example illustrated in FIG. 8, in addition to the first line group 3 and the second line group 6, a dummy line group 7 is provided. More specifically, in the present modification example, the metal lines formed in the line area 8 include the first line group 3 and the second line group 6 that are connected to the first electrode group 2 and the second electrode group 5, which are transparent electrodes, respectively; and the dummy line group 7, which is connected to neither of the first electrode group 2 and the second electrode group 5. The line area 8 is arranged so as to extend to both of the area between the frame 50 and the active area AA, and the area covered with the frame 50. In other words, on each of the four sides of the active area AA, a part of the lines arranged along the side is formed in the area between the active area AA and the frame 50, and the other part of the same is formed in the area covered with the frame 50.

By further providing the dummy line in this way, the degree of the freedom in designing of metal lines can be further increased. For example, in a case where the width of the line area where the metal lines are formed is decreased, when the frame is displaced upon assembly, the following tends to occur, due to influences of crossing of the case body or other members: portions at which the line area overlaps the frame, thereby becoming invisible, and portions at which the line area goes beyond the frame, thereby becoming visible, are present together. In a state where the metal lines are visualized only in a part of an area surrounding the active area, there is possibility that design properties are significantly impaired. To cope with this problem, a dummy line is provided so as to increase the width of the line area, whereby, even in a case where the frame is displaced, the uniformity of the line area can be maintained.

Figure 9A:
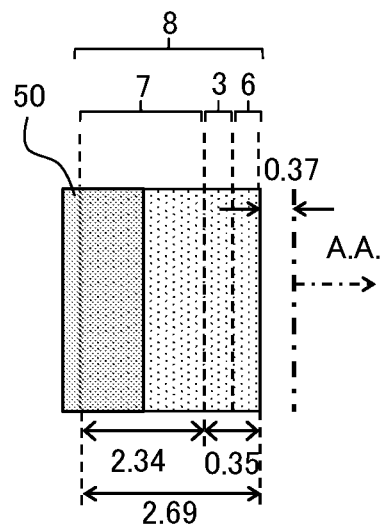
FIG. 9A is an enlarged view of an area R9A indicated by a broken line illustrated in FIG. 8.
Figure 9B:
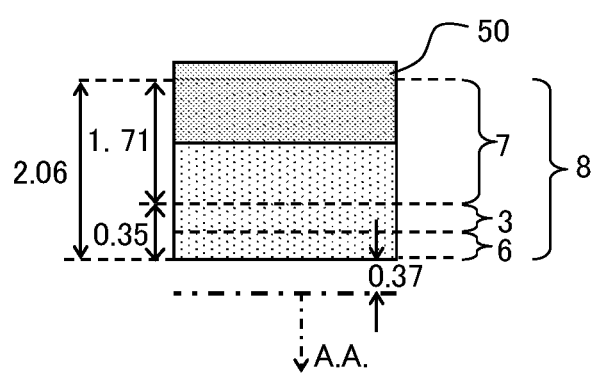
FIG. 9B is an enlarged view of an area R9B indicated by a broken line illustrated in FIG. 8.
Figure 9C:
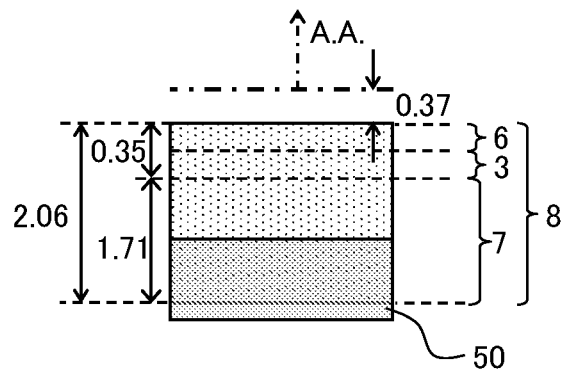
FIG. 9C is an enlarged view of an area R9C indicated by a broken line illustrated in FIG. 8.
Figure 9D:
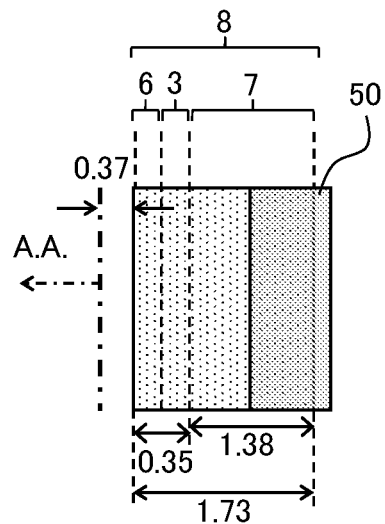
FIG. 9D is an enlarged view of an area R9D indicated by a broken line illustrated in FIG. 8.

In the present modification example, as illustrated in FIGS. 9A to 9D, on any one of the four sides of the active area AA, the lines of the first line group 3 and the second line group 6 among the metal lines have a width of 0.35 mm each, and the distance between the line area 8 and the active area AA is 0.37 mm. As illustrated in FIG. 9A, on the left side of the active area AA, the line area 8 has a width of 2.69 mm, and the dummy line 7 therein has a width of 2.34 mm. As illustrated in FIGS. 9B and 9C, on the upper and lower sides of the active area AA, the line area 8 has a width of 2.06 mm, and the dummy line 7 therein has a width of 1.71 mm. As illustrated in FIG. 9D, on the right side of the active area AA, the line area 8 has a width of 1.73 mm, and the dummy line 7 therein has a width of 1.38 mm. In this way, the distance from the line area 8 and the active area AA is set so as to be equal on the four sides, and on each of the four sides, the line area 8 is formed so as to extend to the area between the active area AA and the frame, as well as to the area that overlaps the frame 50, whereby the uniformity of the line area 8 on the four sides can be increased. This also allows the appearance quality to hardly deteriorate due to the displacement of the frame. Consequently, the appearance quality can be improved.

Figure 10:
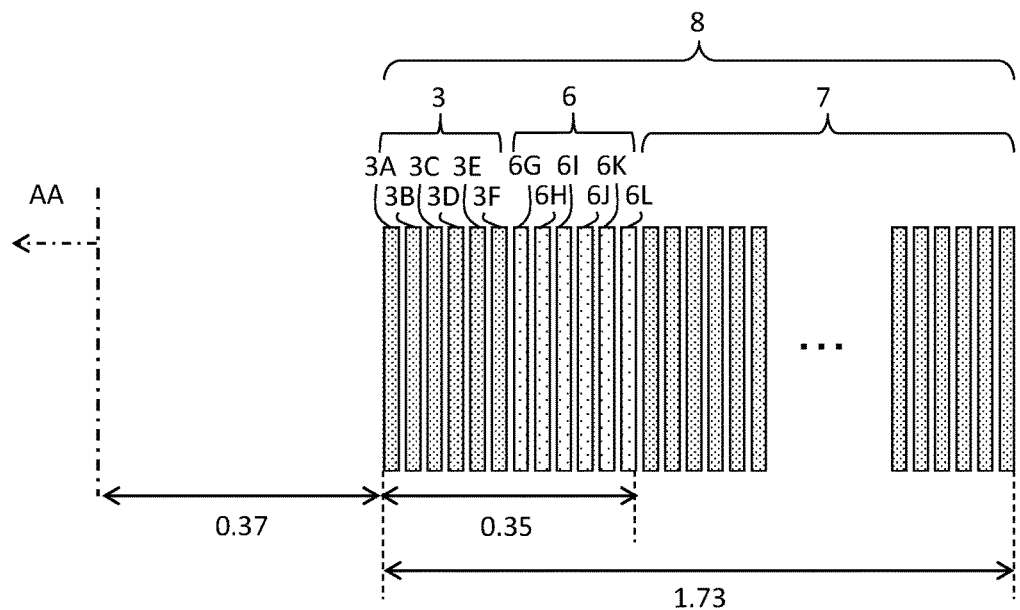
FIG. 10 is a further enlarged view of a part of metal lines illustrated in FIG. 9D.

FIG. 10 is a further enlarged view of a part of the line area 8 illustrated in FIG. 9D. As illustrated in FIG. 10, a plurality of lines extending in the directions along the sides of the active area AA are included in the line area 8. More specifically, the first line group 3, the second line group 6, and the dummy line group 7 are formed so as to be parallel. The dummy line group 7 includes a plurality of lines. As one example, it is possible that the lines included in the dummy line 7 have a line width of 20 μm each, and the distance between the lines, that is, the width of the gap therebetween, is set to 10 μm. With such a configuration that the plurality of lines included in the first line group 3, the second line group 6, and the dummy line group 7 have the same line width each and are arranged at equal intervals, the uniformity (design properties) of the patterns are further improved.

With the gaps (spaces) between linear parts of the lines as in the above-described example, defects caused by the light cutoff by the metal lines, for example, can be suppressed. In a case where, for example, a dummy line group is added so that the width of metal lines is increased, there is possibility that light projected to the UV curing resin when the display panel 10 and the switch liquid crystal panel 20 are bonded is blocked by the metal lines. In other words, it is concerned that portions of the UV curing resin that overlap the metal lines would not be irradiated with light, which results in display defects such as display irregularities and the like. To cope with this, as illustrated in FIG. 10, dummy lines are configured to have slits, whereby defects due to light cutoff by the metal lines can be prevented from occurring.

In the example illustrated in FIG. 8, the line area 8 including the dummy line group reaches the area covered with the frame 50, but the configuration may be such that the line area 8 including the dummy line group is provided only in the area between the active area AA and the frame 50. Further, in the example illustrated in FIGS. 9A to 9D, the widths of the portions not covered with the frame of the metal lines are not equal on the four sides, but by making these equal, the uniformity of the metal line arrangement on the four sides can be improved. Still further, the dummy line group is not necessarily a plurality of lines that are not electrically connected. For example, the configuration may be such that a plurality of parallel linear portions are arrayed, and the linear portions are connected, at their ends, to other linear portions. Alternatively, electrodes having slits extending in the directions along the sides of the active area AA may be used as dummy lines. Still alternatively, metal lines that extend in the directions along the sides of the active area AA and have a plurality of cut portions (notches) may be used as dummy lines.

Modification Example of Arrangement of Sealing Member and Line Area

Figure 11:
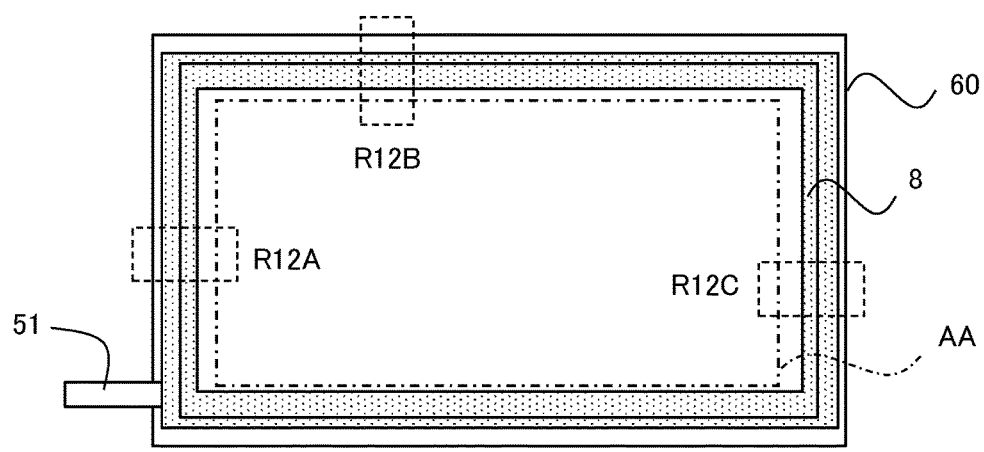
FIG. 11 illustrates an exemplary arrangement of a sealing member and metal lines.
Figure 12A:
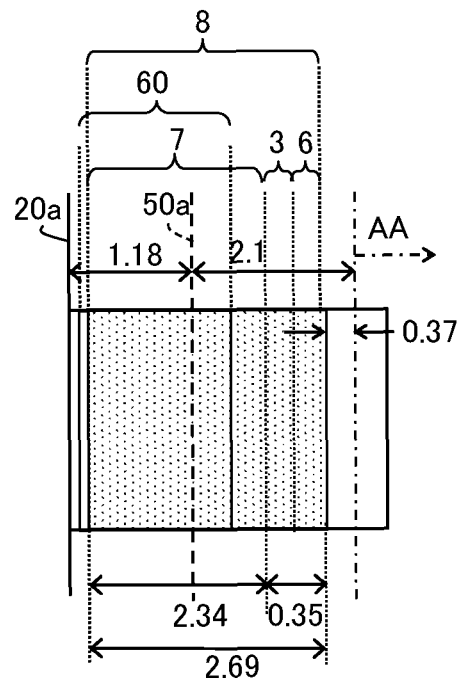
FIG. 12A is an enlarged view of an area R12A indicated by a broken line illustrated in FIG. 11.
Figure 12B:
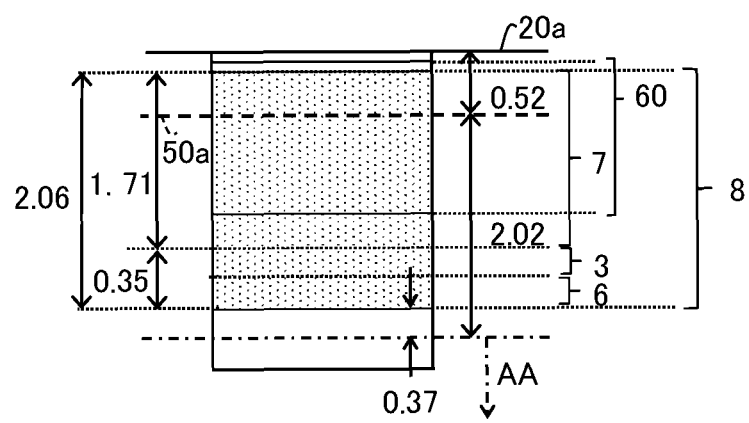
FIG. 12B is an enlarged view of an area R12B indicated by a broken line illustrated in FIG. 11.
Figure 12C:
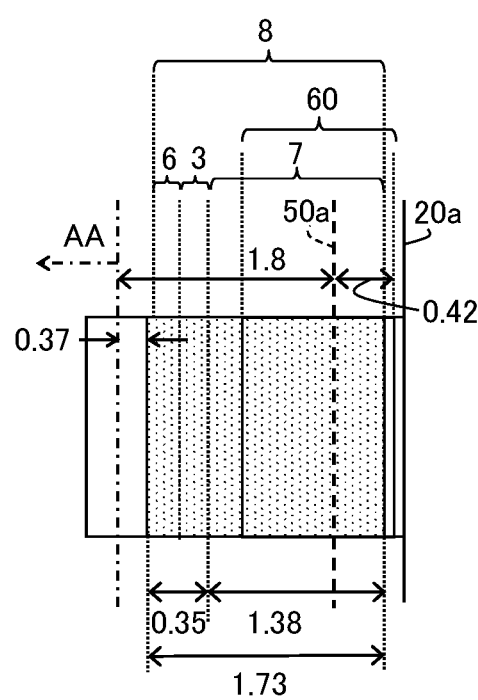
FIG. 12C is an enlarged view of an area R12C indicated by a broken line illustrated in FIG. 11.

FIG. 11 illustrates an exemplary arrangement of the sealing member and the line area. FIGS. 12A, 12B, and 12C are enlarged views illustrating the areas R12A, R12B, and R12C indicated by broken lines in FIG. 11, respectively. An enlarged view of the lower side of the active area AA will be identical to the view of FIG. 12B except that the orientation thereof is changed, and therefore the view is omitted herein. In the example illustrated in FIG. 11, the sealing member 60 is provided outside the active area AA so as to surround the active area AA, similarly to the example illustrated in FIG. 6. As illustrated in FIGS. 11, 12A, 12B, and 12C, on each of the four sides, a part of the line area 8 is formed in an area that overlaps the sealing member 60. Here, only the portions of the dummy lines 7, in the line area 8, are formed in the areas overlapping the sealing member 60. By providing the portions of the dummy line 7 in the areas overlapping the sealing member 60 in this way, defects such as short circuits and the like caused by the sealing member 60 can be prevented from occurring in the first line group 3 and the second line group 6. Further, the line area 8 can be arranged in the area overlapping the sealing member 60, whereby the degree of the freedom in designing of metal lines is further increased.

In the example illustrated in FIG. 11, the configuration is such that a part of the plurality of lines composing the dummy lines 7 overlap the sealing member 60, but the configuration in which the sealing member 60 and the dummy lines 7 overlap is not limited to this example. For example, the dummy lines 7 may overlap the sealing member 60 partially in the lengthwise direction.

Specific Configuration and Producing Method

The following description explains an example of the specific configuration of the first substrate 21, and a method for producing the same, while referring to FIGS. 13A to 13D. The second substrate 22 may have a configuration identical to that of the first substrate 21, and can be produced in a manner similar to that for the first substrate 21.

Figure 13A:
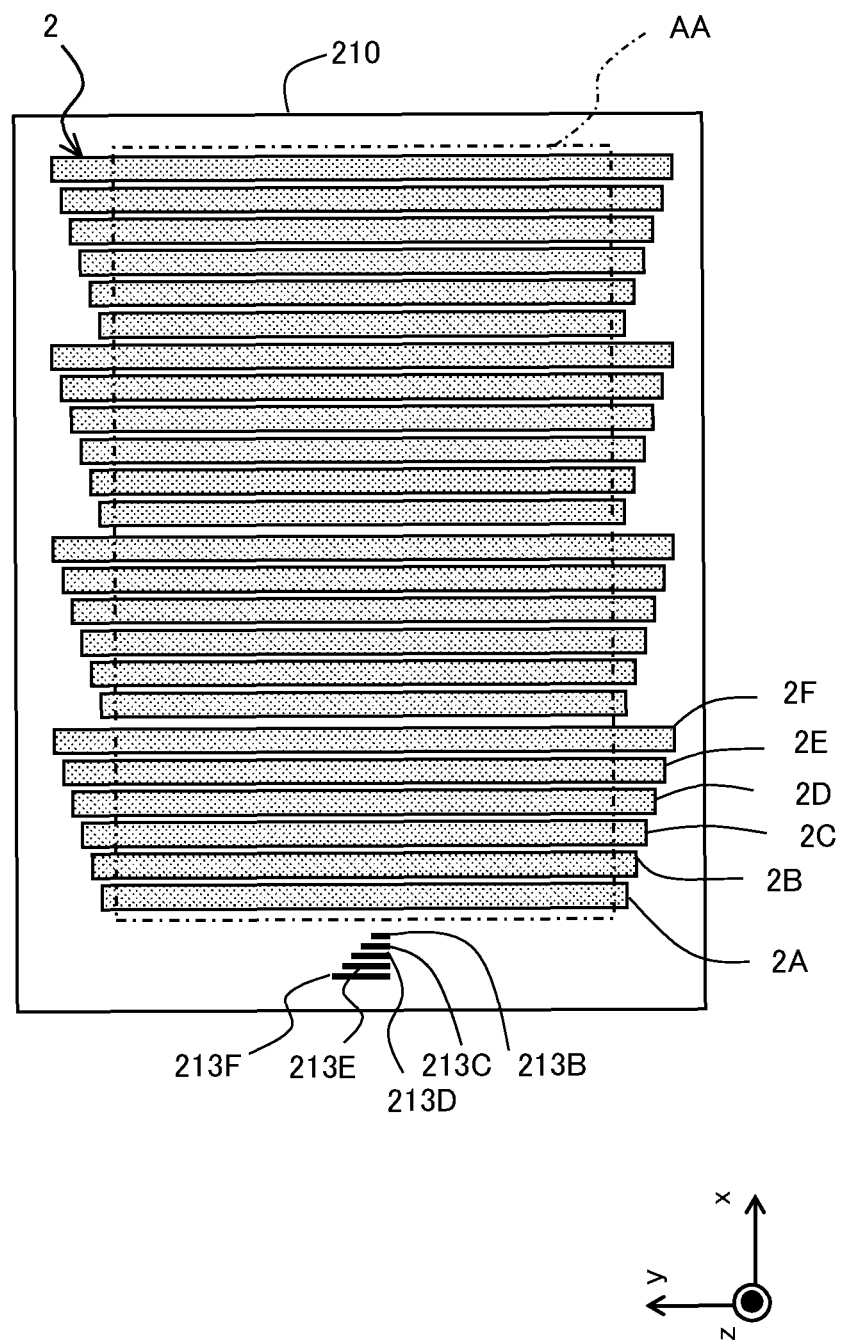
FIG. 13A is a view for explaining an exemplary specific configuration of a first substrate, and a method of producing the same.

First of all, as illustrated in FIG. 13A, the first electrode group 2 and relay electrodes 213 are formed on a substrate 210. In the first electrode group 2, six first electrodes 2A to 2F having different lengths are arrayed cyclically in the x direction. Each of the first electrodes 2A to 2F is formed in a belt-like form extending in the y direction, and both of ends thereof are extended to the outside of the active area AA. Lengths of portions thereof protruding from the active area AA are different from one another, among the six first electrodes 2A to 2F. The relay electrodes 213 are electrodes for relaying the line group 3 that is to be formed in a later step. The relay electrodes 213 include six linear relay electrodes 213B to 213F that correspond to the first electrodes 2B to 2F, respectively, and have different lengths.

The substrate 210 is a substrate having translucency and insulating properties, which is, for example, a glass substrate. The first electrode group 2 preferably has translucency. The first electrode group 2 and the relay electrodes 213 are made of, for example, ITO. The relay electrodes 213 may be made of, for example, aluminum. The first electrode group 2 and the relay electrodes 213 are, for example, formed by sputtering, CVD (chemical vapor deposition), or the like, and patterned by photolithography.

Figure 13B:
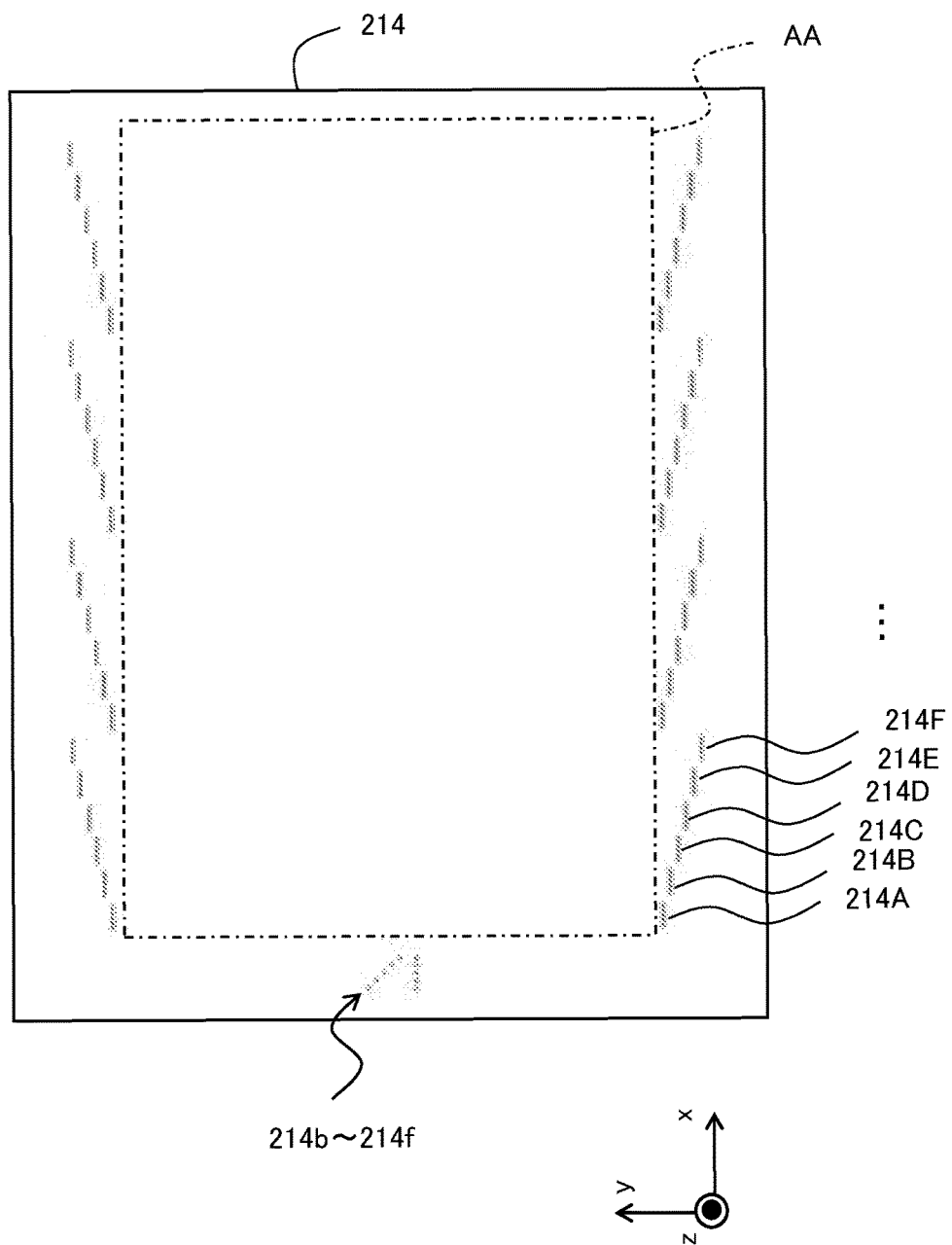
FIG. 13B is a view for explaining an exemplary specific configuration of a first substrate, and a method of producing the same.

Next, an insulating film 214 is formed so as to cover the substrate 210, the first electrode group 2, and the relay electrodes 213 illustrated in FIG. 13A (see FIG. 13B). In the insulating film 214, contact holes 214A to 214F and contact holes 214b to 214f are formed. The contact holes 214A to 214F are formed at such positions that the contact holes 214A to 214F overlap both ends of the first electrode groups 2A to 2F illustrated in FIG. 13A, respectively. The contact holes 214A to 214F connect the first electrode groups 2A to 2F, and the first line groups 3A to 3F, which are to be formed in the next step on the insulating film 214, with each other. The contact holes 214b to 214f are formed at such positions that the contact holes 214b to 214f overlap both ends of the relay electrodes 213B to 213F illustrated in FIG. 13A, respectively.

The insulating film 214 preferably has translucency, and is made of, for example, SiN. For example, the insulating film 214 is formed by CVD and the contact holes 214A to 214F and 214a to 214f are formed by photolithography. The insulating film 214 may be patterned so as to be formed only outside the active area AA.

Figure 13C:
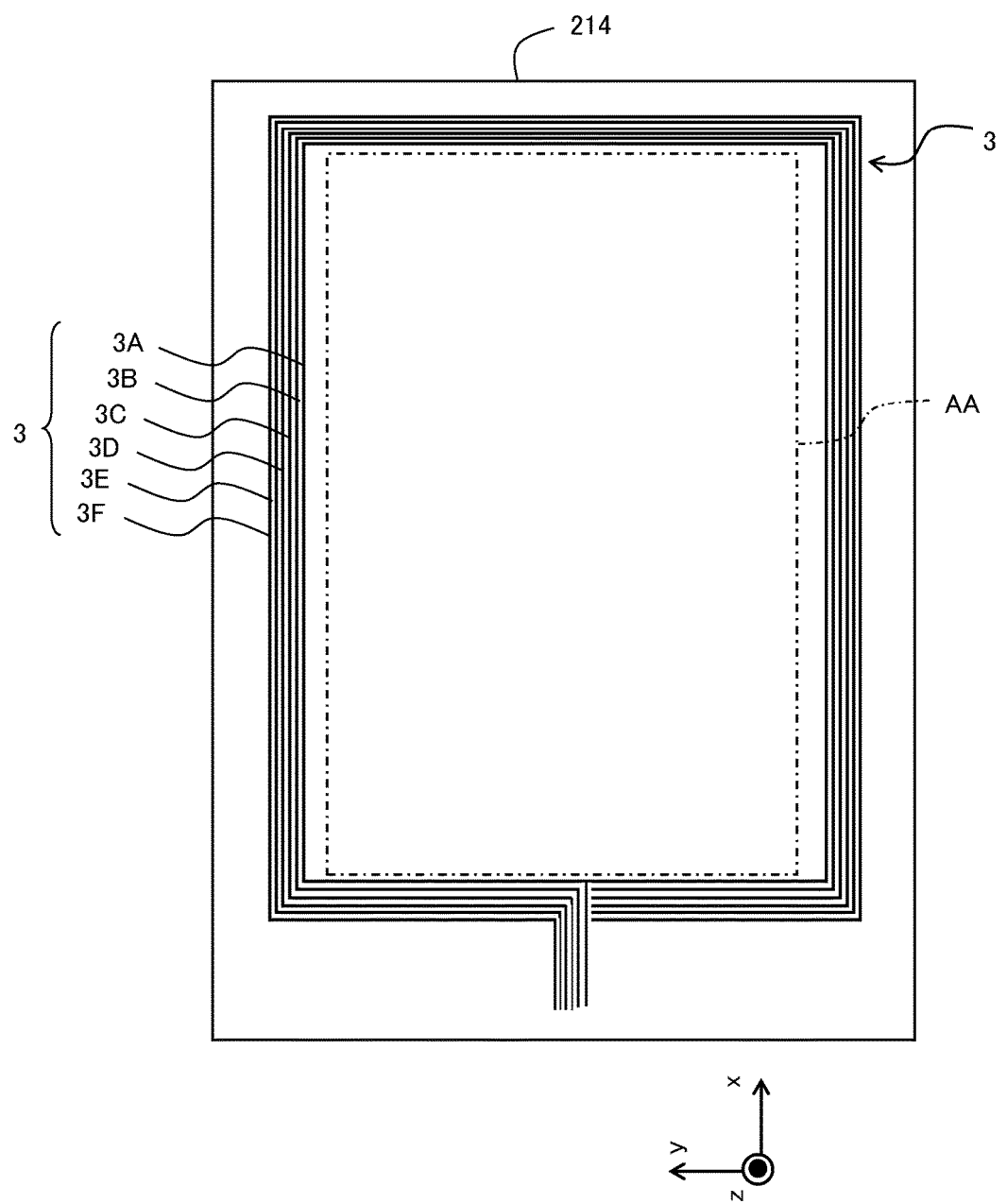
FIG. 13C is a view for explaining an exemplary specific configuration of a first substrate, and a method of producing the same.
Figure 13D:
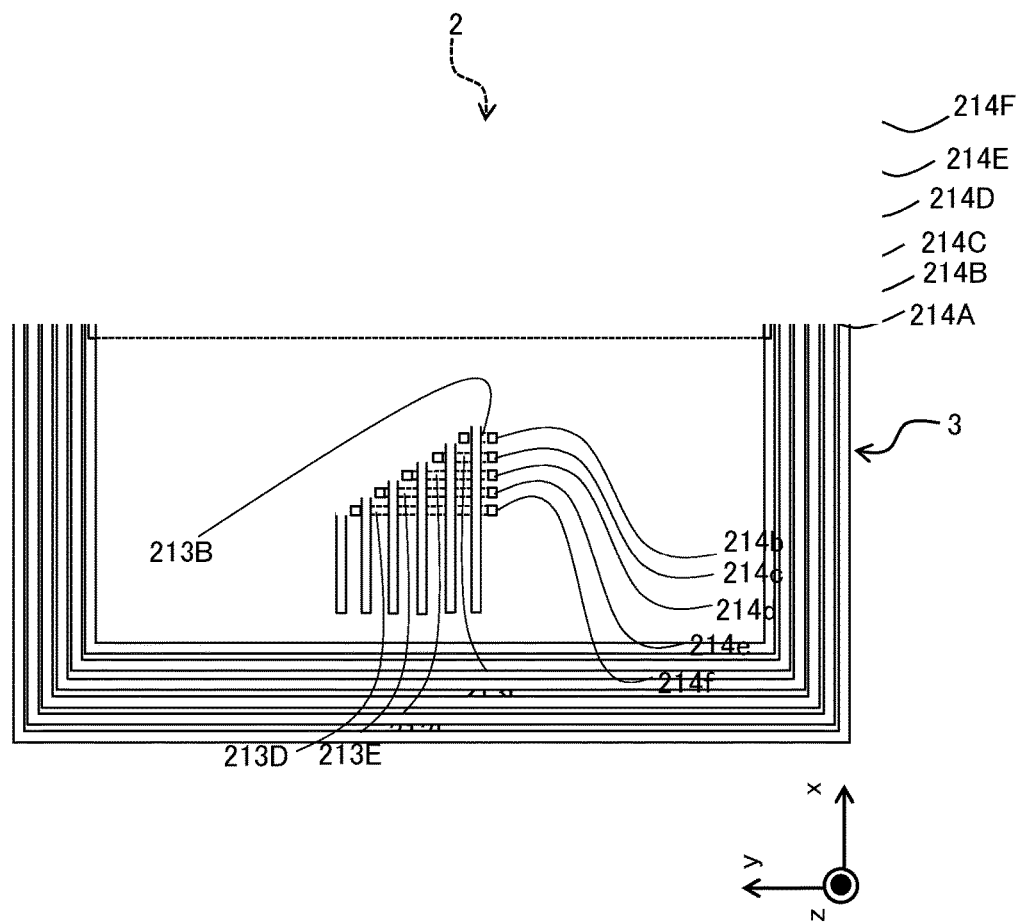
FIG. 13D is an enlarged perspective view of a part of FIG. 13C.

Next, as illustrated in FIG. 13C, the first line groups 3A to 3F are formed on the insulating film 214. FIG. 13D is an enlarged perspective view of a part of FIG. 13C. The first line groups 3A to 3F are connected via the contact holes 214A to 214F to the first electrode groups 2A to 2F, respectively. The first line groups 3A to 3F, drawn out of ends on one side of the first electrode groups 2A to 2F via the contact holes 214A to 214F, and the first line groups 3A to 3F, drawn out of ends on the other side of the first electrode groups 2A to 2F via the contact holes 214A to 214F, are routed around the outside of the active area AA, and join outside one side of the active area AA, and outside another side opposite to the foregoing side, so as to be connected to each other. Thereby, the first line groups 3A to 3F are formed so as to surround the outer circumference of the active area AA. In other words, the active area AA is surrounded by the lines of a sextuple closed loop.

Further, on one side of the active area AA, the first line groups 3A to 3F are connected to terminals for the connection with the outside. In order to connect the first line groups 3A to 3F to the terminals, it is necessary to draw out the five lines 3A to 3E on the inner side, among the first line groups 3A to 3F, to the outer side with respect to the outermost line 3F, without contact with the other lines. Then, as illustrated in FIG. 13D as one example, in a portion where the first line groups 3A to 3F are drawn out to the external terminals, the lines 3B to 3F are routed to the relay electrodes 213B to 213F in a lower layer, with the insulating film 214 being interposed between the lines and the lower layer.

The first line groups 3 preferably have high conductivity, and are made of, for example, aluminum. The first line groups 3 are, for example, formed by sputtering and patterned by photolithography.

In the above-described example, each electrode of the first electrode groups 2 is connected at two positions of the both ends with a pair of the first lines. A signal, therefore, can be applied from both ends in the y direction of each electrode of the first electrode groups. With this configuration, a potential difference in the inside of each electrode can be reduced.

In the above-described example, three layers of the transparent electrodes (ITO), the insulating film (SiN), and the routing lines (metal) are provided on the substrate. The configuration of layers is not limited to this, and for example, an alignment film provided at such a position that the alignment film overlaps the transparent electrodes in the active area AA, and other layers may be appropriately added.

Exemplary Configuration of Function Blocks and Exemplary Operations

Figure 14:
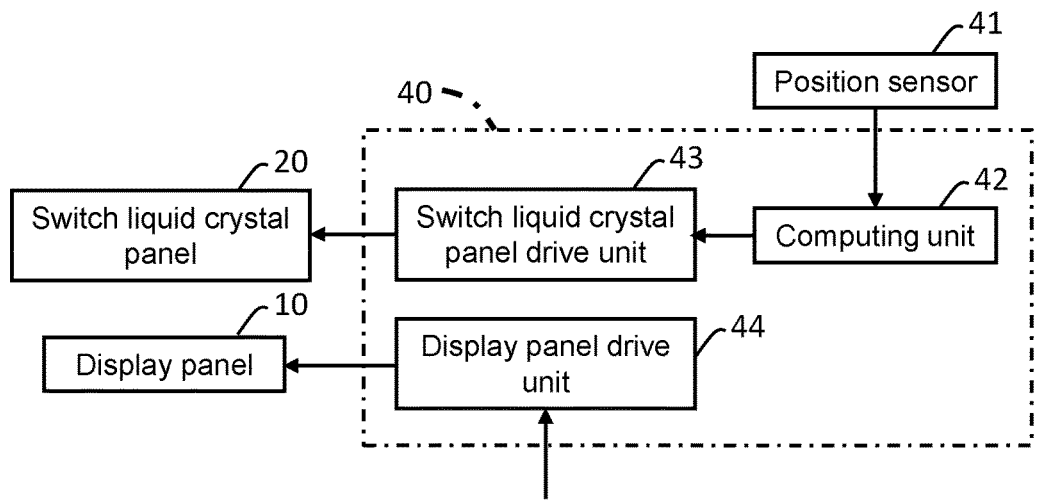
FIG. 14 is a block diagram illustrating a functional configuration of a stereoscopic display device.
Figure 15:
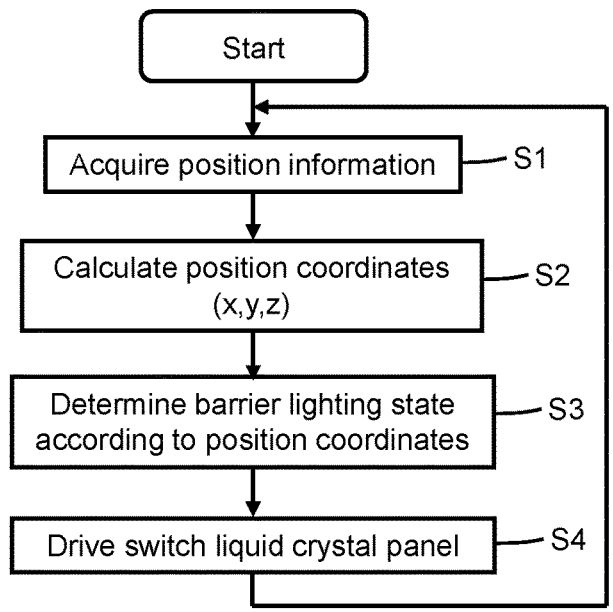
FIG. 15 is a flowchart of a processing operation by the stereoscopic display device.

FIG. 14 is a block diagram illustrating a functional configuration of the stereoscopic display device 1. FIG. 15 is a flowchart illustrating a processing operation by the stereoscopic display device 1. The stereoscopic display device 1 includes a control unit 40 and a position sensor 41. The control unit 40 includes a computing unit 42, a switch liquid crystal panel drive unit 43, and a display panel drive unit 44.

The display panel drive unit 44 drives the display panel 10 based on a video signal that is input from outside, and causes the display panel 10 to display an image.

The position sensor 41 acquires position information regarding the position of the viewer 90 (Step S1). The position sensor 41 is, for example, a camera or an infrared light sensor. The position sensor 41 supplies the acquired position information to the computing unit 42 of the control unit 40.

The computing unit 42 analyzes the position information of the viewer 90 supplied from the position sensor 41, and calculates position coordinates (x, y, z) of the viewer 90 (Step S2). The calculation of the position coordinates can be performed by, for example, an eye tracking system for detecting the position of the eyes of the viewer 90 by image processing. Alternatively, the calculation of the position coordinates may be performed by a head tracking system for detecting the position of the head of the viewer 90 with infrared light.

The computing unit 42 further determines a barrier lighting state of the switch liquid crystal panel 20 according to the position coordinates of the viewer 90 (Step S3). More specifically, according to the position coordinates of the viewer 90, the positions of the barriers and the positions of the slits of the switch liquid crystal panel 20 are determined. The computing unit 42 supplies the determined information of the barrier lighting state to the switch liquid crystal panel drive unit 43.

The switch liquid crystal panel drive unit 43 drives the switch liquid crystal panel 20 based on the information supplied from the computing unit 42 (Step S4). Thereafter, Steps S1 to S4 are repeated.

Figure 16A:
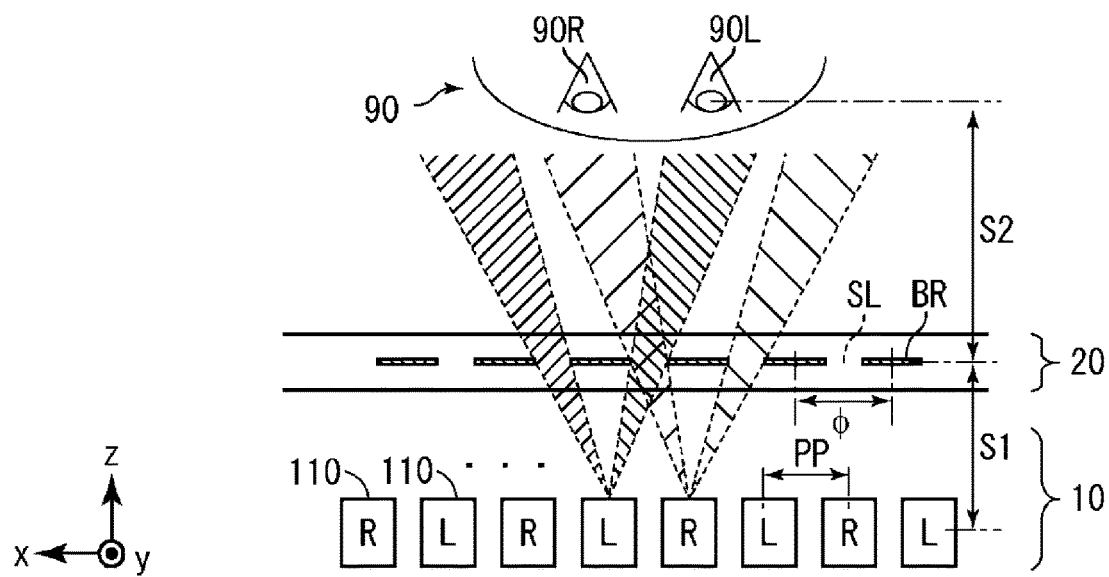
FIG. 16A is a view for explaining exemplary stereoscopic display by a stereoscopic display device 1.
Figure 16B:
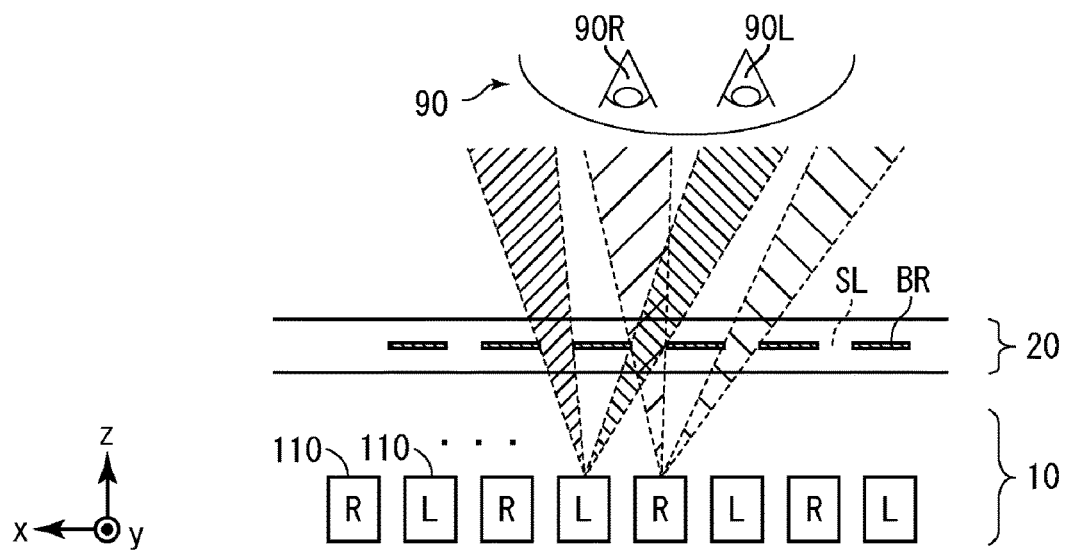
FIG. 16B is a view for explaining exemplary stereoscopic display by the stereoscopic display device 1.
Figure 16C:
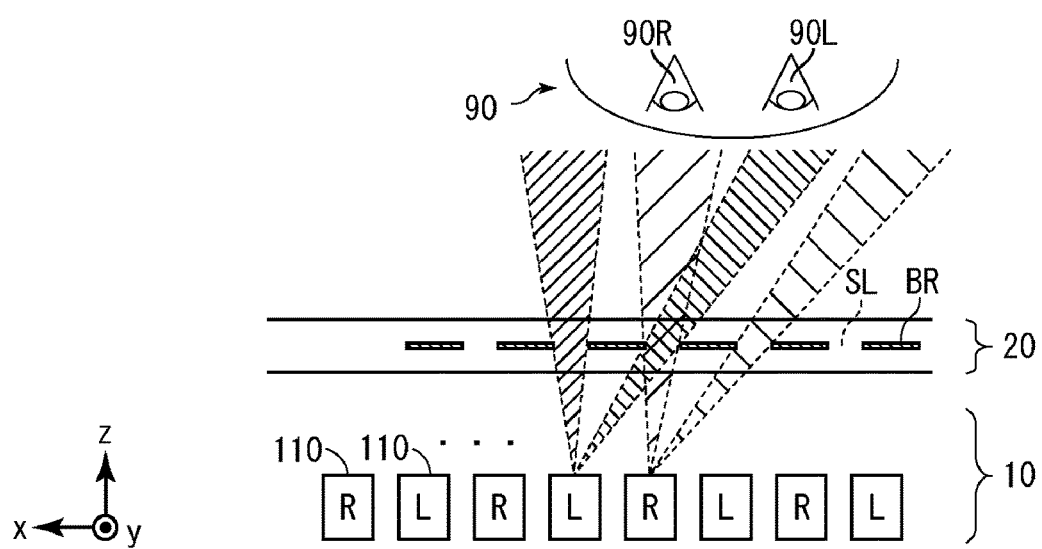
FIG. 16C is a view for explaining exemplary stereoscopic display by the stereoscopic display device 1.

Next, the following description explains exemplary stereoscopic display by the stereoscopic display device 1, using FIGS. 16A to 16C.

The display panel 10 includes a plurality of pixels 110. On the pixels 110, a right-eye image (R) and a left-eye image (L) are alternately displayed in the horizontal direction. In the switch liquid crystal panel 20, barriers BR that block light from the display panel 10 and slits SL that transmit light from the display panel 10 are formed at predetermined intervals. This allows only the right-eye image (R) to be visible to the right eye 90R of the viewer 90, and allows only the left-eye image (L) to be visible to the left eye 90L, as illustrated in FIG. 16A. This allows the viewer 90 to have a stereoscopic vision (normal area).

The interval PP of the pixels 110 and the interval φ of the barriers BR satisfy the relationship expressed by the following:

$$\varphi \approx 2 \times PP \times (S2)/(S1+S2)$$

where S1 is a distance from the display surface of the display panel 10 to the barriers BR, and S2 is a distance from the barriers BR to the viewer 90. When S2>>S1, $\varphi \approx 2 \times PP$ is satisfied.

FIG. 16B illustrates a state in which the viewer 90 has moved from the position shown in FIG. 16A in the horizontal direction. In this case, to the right eye 90R of the viewer 90, both of the right-eye image (R) and the left-eye image (L) are visible, if the barrier lighting state of the switch liquid crystal panel 20 remains to be the state illustrated in FIG. 16A. Similarly, to the left eye 90L, both of the right-eye image (R) and the left-eye image (L) are visible. In this case, the viewer 90 cannot have a stereoscopic vision (crosstalk area). To address this, as illustrated in FIG. 16B, the control unit 40 changes the barrier lighting state of the switch liquid crystal panel 20, so as to cause only the right-eye image (R) to be visible to right eye 90R of the viewer 90, and to cause only the left-eye image (L) to be visible to the left eye 90L thereof.

FIG. 16C illustrates a state in which the viewer 90 has further moved from the position shown in FIG. 16B in the horizontal direction. In this case, to the right eye 90R of the viewer 90, the left-eye image (L) is visible, and to the left eye 90L thereof, the right-eye image (R) is visible, if the barrier lighting state of the switch liquid crystal panel 20 remains to be the state illustrated in FIG. 16A. As a result, the viewer 90 cannot have a correct stereoscopic vision (pseudoscopic area). To address this, as illustrated in FIG. 16C, the control unit 40 changes the barrier lighting state of the switch liquid crystal panel 20, so as to cause only the right-eye image (R) to be visible to the right eye 90R of the viewer 90, and to cause only the left-eye image (L) to be visible to the left eye 90L thereof.

In this way, the control unit 40 changes the barrier lighting state of the switch liquid crystal panel 20 according to the position information (position coordinates) of the viewer 90. This allows the state in the normal area to be maintained always, and prevents crosstalk and the state of pseudoscopic vision from occurring.

In order to perform barrier control corresponding to the position information of the viewer by using the switch liquid crystal panel 20, it is necessary to arrange, in the active area AA, a plurality of transparent electrodes that are controlled by lines of a plurality of systems. As a result, many metal lines are arranged around the active area AA. In such a situation, the effect achieved by the configuration of the present embodiment in which metal lines are arranged along the four sides of the active area AA is exhibited more clearly.

Embodiment 2

Exemplary Electrode Arrangement in Switch Liquid Crystal Panel

Figure 17A:
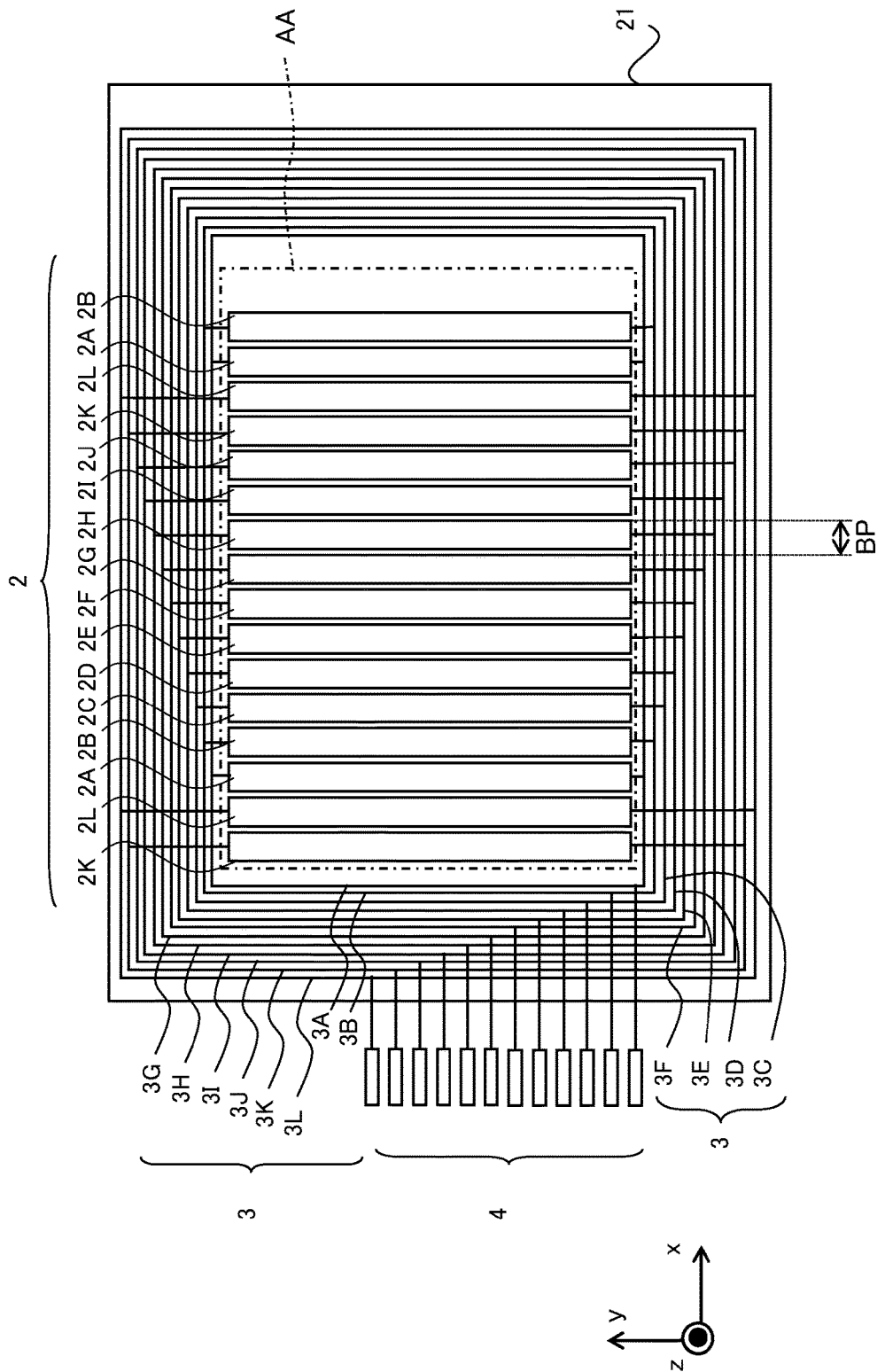
FIG. 17A illustrates an exemplary arrangement of electrodes provided on a first substrate in Embodiment 2.
Figure 17B:
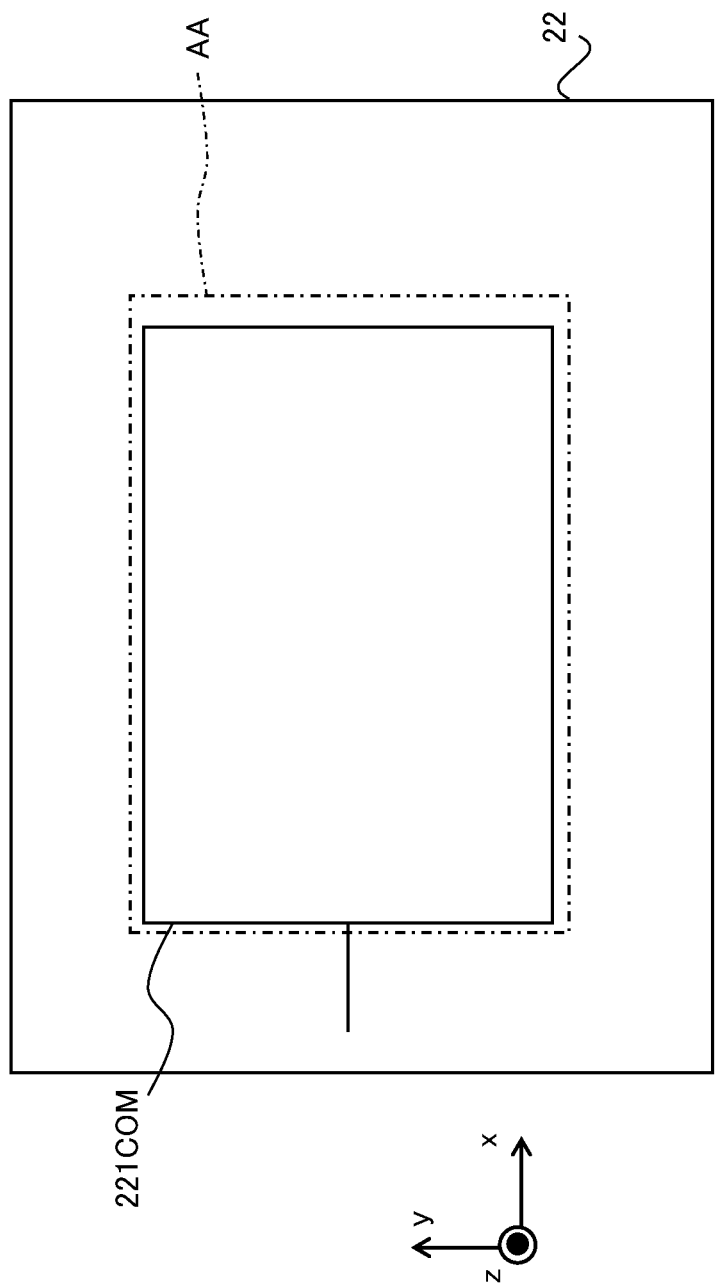
FIG. 17B illustrates an exemplary arrangement of electrodes provided on a second substrate.

The present embodiment is a modification example of the electrode arrangement on the first substrate and the second substrate of the switch liquid crystal panel in Embodiment 1 described above. FIG. 17A illustrates an exemplary arrangement of electrodes provided on the first substrate 21 of the switch liquid crystal panel 20 in Embodiment 2. FIG. 17B illustrates an exemplary arrangement of electrodes provided on the second substrate 22. In the example illustrated in FIGS. 17A and 17B, line groups and electrode groups of a plurality of systems are formed on the first substrate 21, and a line group and an electrode group of one system are formed on the second substrate 22.

In the example illustrated in FIG. 17A, the first electrode group 2 and the first line group 3 are provided on the first substrate 21 so as to be arranged in the active area AA, and outside the active area AA, respectively. The first electrode group 2 is a transparent electrode group. The first electrode group 2 includes a plurality of electrodes arranged along the x direction at electrode intervals BP. Each of the electrodes extends in the y direction, and the electrodes are arranged in parallel with one another.

The first line group 3 is composed of metal lines provided on the four sides of the active area AA. The first electrode group 2 is connected to the first line group 3. The first line group 3 is also connected to the terminals 4 for the connection with the outside. To the terminals 4, for example, a control unit is connected.

In the present example, the first line group 3 includes line groups of 12 systems 3A to 3L, and the first electrode group 2 includes electrode groups of 12 systems 2A to 2L. The line groups of 12 systems 3A to 3L are connected to the electrode groups of 12 systems 2A to 2L, respectively. To the electrode groups of 12 systems 2A to 2L, voltages VA to VL that are independent from one another can be applied, respectively.

FIG. 17B is a plan view illustrating a configuration of the second substrate 22 of the switch liquid crystal panel 20. On the second substrate 22, a common electrode 221 COM is formed so as to cover a substantially entire surface of the active area AA. To the common electrode 221 COM, a signal VCOM is supplied from the control unit 40.

Figure 18:
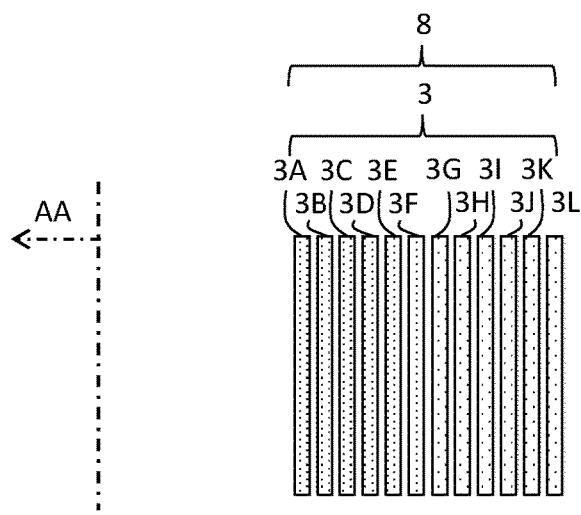
FIG. 18 is an enlarged view illustrating a part of metal lines.

The arrangement of the metal lines and the frame in the present embodiment can be similar to that of the configuration illustrated in FIG. 3 or 8 according to Embodiment 1 described above. In the present embodiment, however, the first line groups 3A to 3L, which are metal lines that are arranged along the four sides of the active area AA and that are connected to the transparent electrodes (in the present example, the first electrodes 2) provided in the active area AA, are formed on the first substrate 21. FIG. 18 is an enlarged view of a part of metal lines formed along the right side of the active area AA. As illustrated in FIG. 18, the metal lines include a plurality of first line groups 3 formed on the first substrate 21. The first line groups 3 include a plurality of parallel lines that extend in the directions along the sides of the active area AA. In this way, by forming all of the metal lines on the first substrate 21, displacement of positions of the line groups resulting from displacement occurring when the first substrate 21 and the second substrate 22 are bonded can be prevented.

Figure 19:
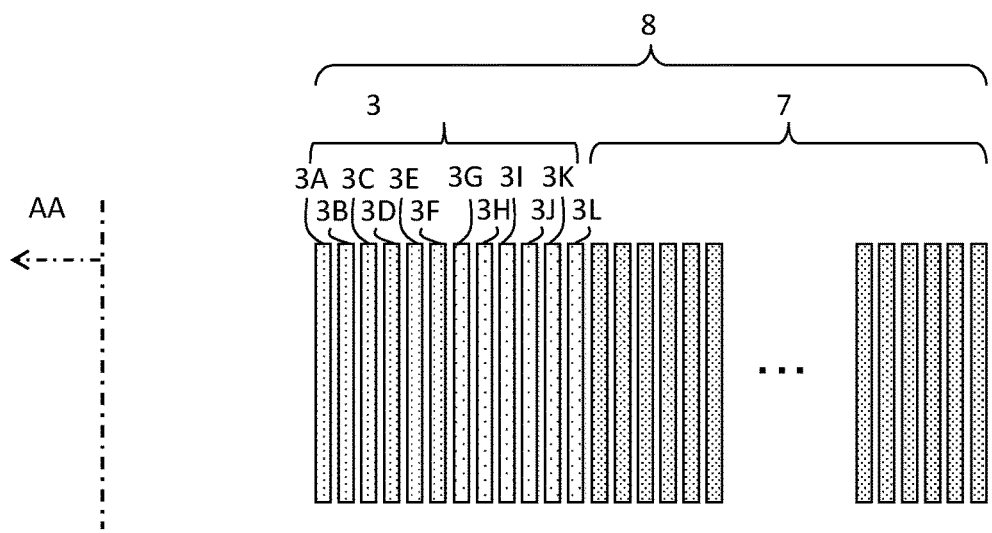
FIG. 19 is an enlarged view illustrating a part of metal lines including dummy lines.

As illustrated in FIG. 19, a dummy line group 7 may be additionally provided as metal lines. The dummy line group 7 may be provided in any one of the first substrate 21 and the second substrate 22. Further, the arrangement of the metal lines and the sealing member in the present embodiment can be similar to that of the configuration illustrated in FIG. 6 or 11 according to Embodiment 1 described above.

Embodiment 3

Figure 20:
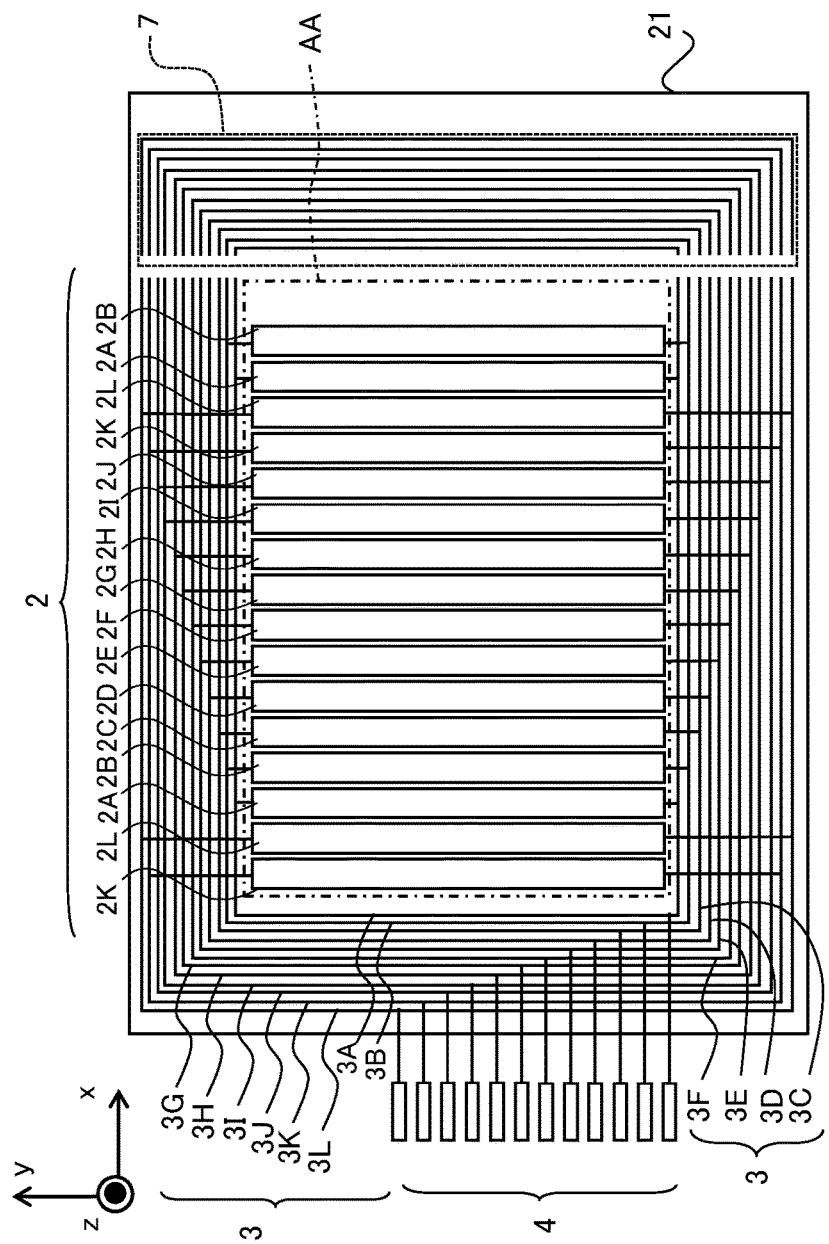
FIG. 20 illustrates an exemplary electrode configuration in a first substrate in Embodiment 3.

FIG. 20 illustrates an exemplary electrode configuration on the first substrate 21 according to Embodiment 3. In the example illustrated in FIG. 20, on the side (the right side) other than the sides from which the lines connected to the first electrodes 2 as transparent electrodes are drawn out (the upper and lower sides) and the side on which the terminals 4 are provided (the left side), among the sides of the active area AA, only the dummy line group is formed along the sides. In Embodiments 1 and 2 described above, the line groups connected to the transparent electrodes provided in the active area AA (that is, the first electrodes 2 and the second electrodes 5) are arranged on all of the four sides of the active area AA. In contrast, the configuration may be such that, as is the case with the present embodiment, regarding at least one side among the four sides of the active area AA, only dummy lines, which are not connected to the transparent electrodes, are arranged along the above-mentioned side. In the present example, on one side among the four sides, no line group connected to the transparent electrodes in the active area AA is provided, but the configuration can be such that, on one side among the four sides, the number of line groups connected to the transparent electrodes is reduced, as compared with the other sides.

Generally speaking, an outer area outside the active area AA on the side opposite to the side where the terminals are provided (on the side opposite to the terminal side) tends to be narrower, as compared with the area on the terminal side. On the side opposite to the terminal side, therefore, it is difficult to make spaces between the lines finer. For example, when spaces between the lines are reduced, defects such as short circuits tend to occur in portions where the lines overlap the sealing part. In such a case, by making the lines dummy as in the present embodiment, the problems such as the occurrence of short circuits can be avoided, whereby the degree of the freedom in designing of metal lines can be increased.

Effects of Embodiments

In the embodiments described above, metal lines are uniformly routed all around the switch liquid crystal panel (around the four sides thereof), so that the metal patterns are arranged at such positions that they are visible from the viewer. By purposely forming the metals lines so that they are visible in this way, margins for the assembly of a case body of the display device and the like can be expanded, whereby the productivity can be improved.

As dummy lines are used for the metal lines, the routing of lines to the sealing part is enabled. For example, metal lines (solid lines) connected to the transparent electrodes can be arranged in the area between the active area AA and the sealing member, and dummy lines can be arranged in the area of the sealing member and the area between the sealing member and the ends of the switch liquid crystal panel (the outer shape thereof). As the dummy lines are provided as the metal lines in an area overlapping the sealing member, influences of short circuits of lines due to conductive materials such as Au pearls in the sealing can be avoided.

Further, by forming the metal lines in a slit form by providing line portions and space portions alternately, display irregularities due to the UV resin can be suppressed. In other words, by forming the dummy lines in a slit form (making the dummy lines finer), light is allowed to pass through interstices between the lines even if the line width is increased, which makes it possible to prevent curing irregularities of the UV resin below the metal lines (display quality degradation).

Other Modification Example

In the above-described embodiments, the switch liquid crystal panel is arranged on the upper side (on the viewer side) with respect to the display panel (the front arrangement). Thereby, the effect of improving the appearance quality is further enhanced. Even in a case where the switch liquid crystal panel is arranged below the display panel (on the side opposite to the viewer), the effect of increasing the degree of the freedom in designing of lines can be achieved.

The metal lines are not limited to those in linear patterns. For example, the metal lines may be formed in a wavelike pattern, a flower pattern, a pattern with a particular mark or design, etc. For example, a pattern in which a particular mark or design is arrayed cyclically along the sides of the active area can be formed as metal lines.

Further, a part of the transparent electrodes may be formed outside the active area, or a part of the metal lines may be formed in the active area.

The above-described embodiments are explained with reference to, as an example, a switch liquid crystal display (SW-LCD) of a barrier division type in which the parallax barrier is formed by the switch liquid crystal panel and the parallax barrier is moved in accordance with the position of the viewer, but the switch liquid crystal panel is not limited to this example. For example, the switch liquid crystal panel may be a switch liquid crystal panel of a stereoscopic display device of another type, or may be a viewing angle control panel.

Still further, the display panel of the present invention is not limited to the liquid crystal display panel. The display panel may be, for example, an organic EL display, a plasma display, or the like.

DESCRIPTION OF REFERENCE NUMERALS

1 Stereoscopic display device
10 Display panel
20 Switch liquid crystal panel
21 First substrate
2 First electrode group
3 First line group
22 Second substrate
5 Second electrode group
6 Second line group
23 Liquid crystal layer
30 Adhesive resin
40 Control unit
41 Position sensor

The invention claimed is:
1. A display device comprising:
a display panel having a display region for displaying an image;
a switch liquid crystal panel arranged so as to be stacked on the display panel; and
a control unit that controls the switch liquid crystal panel, wherein
the switch liquid crystal panel includes:
 a first substrate;
 a second substrate arranged so as to be opposed to the first substrate;
 a liquid crystal layer provided between the first substrate and the second substrate;
 a transparent electrode provided in an active area that is an area overlapping the display region of the display panel, on at least one of the first substrate or the second substrate, wherein a voltage thereof is controlled based on a signal from the control unit; and
 a metal line provided outside the active area, along four sides of the active area, on at least one of the first substrate and the second substrate, and
the metal line includes a plurality of metal wires, and the plurality of metal wires include a wire connected to the transparent electrode, and a dummy line not connected to the transparent electrode.

2. The display device according to claim 1, wherein the metal line includes a plurality of linear portions arranged in parallel, with a gap being interposed therebetween.

3. The display device according to claim 1, wherein on at least one side of the four sides of the active area, only the dummy line is formed as the metal line.

4. The display device according to claim 1, further comprising a sealing member that bonds the first substrate and the second substrate, wherein at least a part of the dummy line is provided at such a position that the part overlaps the sealing member.

5. A display device comprising:
a display panel having a display region for displaying an image;
a switch liquid crystal panel arranged so as to be stacked on the display panel; and
a control unit that controls the switch liquid crystal panel, wherein
the switch liquid crystal panel includes:
 a first substrate;
 a second substrate arranged so as to be opposed to the first substrate;
 a liquid crystal layer provided between the first substrate and the second substrate;
 a transparent electrode provided in an active area that is an area overlapping the display region of the display panel, on at least one of the first substrate or the second substrate, wherein a voltage thereof is controlled based on a signal from the control unit; and
 a metal line provided outside the active area, along four sides of the active area, on at least one of the first substrate and the second substrate;
the display device further comprises a frame provided so as to surround the active area, and
on the four sides of the active area, at least a part of the metal line is formed in an area between the frame and the active area.

6. The display device according to claim 5, wherein the entirety of the metal line is formed in the area between the frame and the active area.

7. The display device according to claim 5, wherein the area between the frame and the active area, where the metal line is formed, has a uniform width on the four sides of the active area.

8. The display device according to claim 5, wherein the metal line includes a plurality of linear portions arranged in parallel, with a gap being interposed therebetween.

9. A display device comprising:
a display panel having a display region for displaying an image;
a switch liquid crystal panel arranged so as to be stacked on the display panel; and
a control unit that controls the switch liquid crystal panel, wherein
the switch liquid crystal panel includes:
 a first substrate;
 a second substrate arranged so as to be opposed to the first substrate;
 a liquid crystal layer provided between the first substrate and the second substrate;
 a transparent electrode provided in an active area that is an area overlapping the display region of the display panel, on at least one of the first substrate or the second substrate, wherein a voltage thereof is controlled based on a signal from the control unit; and a metal line provided outside the active area, along four sides of the active area, on at least one of the first substrate and the second substrate; and the metal line includes a plurality of first lines formed on the first substrate, along the four sides of the active area, and a plurality of second lines formed on the second substrate, along the four sides of the active area, wherein the first lines and the second lines are formed at such positions that the first lines and the second lines do not overlap.

10. The display device according to claim 9, wherein the metal line further includes a plurality of linear portions arranged in parallel, with a gap being interposed therebetween.

* * * * *